US010063758B2

(12) United States Patent
Scheich

(10) Patent No.: US 10,063,758 B2
(45) Date of Patent: Aug. 28, 2018

(54) VEHICLE PHOTOGRAPHIC TUNNEL

(71) Applicant: Davo Scheich, Troy, MI (US)

(72) Inventor: Davo Scheich, Troy, MI (US)

( * ) Notice: Subject to any disclaimer, the term of this patent is extended or adjusted under 35 U.S.C. 154(b) by 267 days.

(21) Appl. No.: 14/875,115

(22) Filed: Oct. 5, 2015

(65) Prior Publication Data

US 2016/0100087 A1 Apr. 7, 2016

Related U.S. Application Data

(60) Provisional application No. 62/059,654, filed on Oct. 3, 2014.

(51) Int. Cl.
*H04N 5/225* (2006.01)
*B60R 1/00* (2006.01)
*G06K 9/46* (2006.01)
*H04N 13/02* (2006.01)
*G06F 17/30* (2006.01)
*H04N 5/247* (2006.01)
*H04N 5/235* (2006.01)
*G06T 1/00* (2006.01)

(52) U.S. Cl.
CPC ..... *H04N 5/2256* (2013.01); *G06F 17/30262* (2013.01); *G06T 1/0007* (2013.01); *H04N 5/2354* (2013.01); *H04N 5/247* (2013.01); *H04N 13/0242* (2013.01)

(58) Field of Classification Search
None
See application file for complete search history.

(56) References Cited

U.S. PATENT DOCUMENTS

| 4,918,321 | A | * | 4/1990 | Klenk | G01B 11/00 250/559.05 |
| 5,636,024 | A | * | 6/1997 | Crookham | G01M 11/005 356/237.1 |
| 5,726,705 | A | * | 3/1998 | Imanishi | G01N 21/8806 348/92 |
| 6,266,138 | B1 | * | 7/2001 | Keshavmurthy | G01B 11/303 356/237.2 |
| 6,320,654 | B1 | * | 11/2001 | Alders | G01N 21/8806 356/237.2 |
| 2006/0114531 | A1 | * | 6/2006 | Webb | G01N 21/8806 359/15 |

(Continued)

*Primary Examiner* — Kate Luo
(74) *Attorney, Agent, or Firm* — Avery N. Goldstein; Blue Filament Law, PLLC

(57) ABSTRACT

A system and method for automatically photographing vehicles in a drive-thru structure is provided where the passage of a vehicle triggers an automated process that captures a series of vehicle images, and uploads the captured images to a web template for display and recordation. The images captured have controlled reflections from multiple angles and perspectives. A viewer is able to discern whether there are surface imperfections, scratches, and dents on a vehicle surface. Reflections are controlled in the structure or circular chamber with curved walls that are covered with a light scattering sheet material such as a white canvas or gray walls. The lighting style used to illuminate the vehicle within the structure is a sunset horizon style of lighting, where the lights are hidden below the curved wall that may be gray or white so as to use a sunset style reflection on the vehicle surface through subtractive lighting.

16 Claims, 27 Drawing Sheets

(56) References Cited

U.S. PATENT DOCUMENTS

| | | | |
|---|---|---|---|
| 2006/0182308 A1* | 8/2006 | Gerlach | G01B 11/2545 382/100 |
| 2008/0250585 A1* | 10/2008 | Auer | B60S 3/04 15/53.2 |
| 2010/0067801 A1* | 3/2010 | van den Hengel | G08B 13/19645 382/190 |
| 2010/0238290 A1* | 9/2010 | Riley | H04N 5/2251 348/148 |
| 2013/0107041 A1* | 5/2013 | Norem | H04N 5/225 348/143 |

\* cited by examiner

FIG. 12A
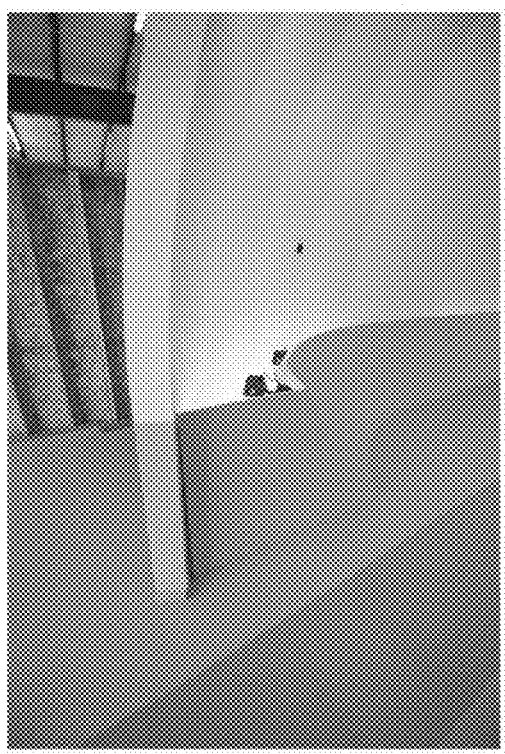 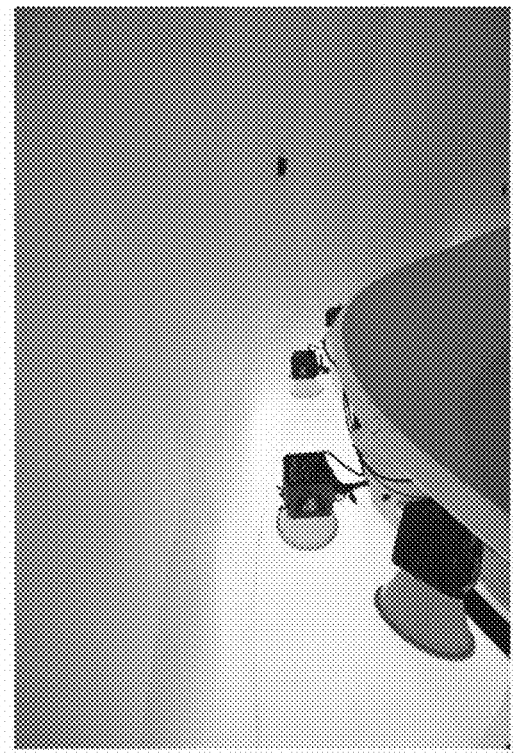
FIG. 12B  FIG. 12C

VEHICLE PHOTOGRAPHIC TUNNEL

RELATED APPLICATIONS

This application claims priority benefit of U.S. Provisional Application Ser. No. 62/059,654 filed Oct. 3, 2014; the contents of which are hereby incorporated by reference.

FIELD OF THE INVENTION

The present invention in general relates to a system for photographing vehicles; and in particular to a drive-thru structure where the passage of a vehicle triggers an automated process that captures a series of vehicle images and uploads the captured images to a web template for display and recordation.

BACKGROUND OF THE INVENTION

Auto auctions play a major role as a wholesale market for second-hand vehicles. Most auto auctions are closed auctions, meaning only dealers can use them. There are also auctions that are open to the public. These auctions are a primary outlet for financial services firms to dispose of their large volume of off-lease returns, for rental and other companies to sell off their aging fleets, and for car dealerships to dump trade-ins or other unwanted inventory. Some auctions are used by banks, the Internal Revenue Service, and other government agencies to sell vehicles that were repossessed for failure to make monthly payments or pay taxes, or were seized by the government agencies, or the police. Auctions are also used to sell U.S. Government vehicles.

Online auto auctions have also been growing in popularity. One of the most popular online auctions to buy vehicles from is eBay™. On eBay Motors™, a user can create an account and put their vehicles up for auction. Other popular websites include Cars.com™. Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicles condition and appearance. FIGS. 1A and 1B are typical non-studio quality vehicle photographs that are used to list vehicles for sale. The images shown in FIGS. 1A and 1B are of low quality and require a dedicated employee to move vehicles and physically move around the subject vehicle to take the pictures. The photographer also has to manually collate the images, name, and upload the files, which is a labor intensive and time consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however reflection free images are critical to be able to discern surface imperfections, scratches, and dents on a vehicle surface. FIGS. 2A and 2B illustrate an existing studio configuration 10 for generating a contrast break line 12 on a vehicle with additive lighting. The bottom edge 16 of a light box 14 creates the break line 12 between highlight and shadow. FIGS. 3A and 3B illustrate an existing studio configuration 20 for generating a contrast break line 12 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus there is a need to be able to rapidly produce high quality reflection free images of vehicles from multiple angles and perspectives.

SUMMARY OF THE INVENTION

A system for photographing vehicles is provided, the system housed in a drive-thru structure with a plurality of cameras mounted within the walls for recording images of a vehicle, where at least one camera, video system, or computing system is used to generate 3D data from the vehicle passed through the structure. The system further includes a lighting system; a tracking system to actuate one or more of the plurality of cameras and lights in a predetermined sequence and combination based on the position of the vehicle within the drive-thru structure; a wall for implementing subtractive lighting on the surface of the vehicle; and wherein the images of the vehicle are uploaded in a database.

A process for photographing a vehicle is provided that involves driving the vehicle through a structure; selectively illuminating a first subset of lights arrayed in the structure; collecting a first photograph of a plurality of photographs of the vehicle while in motion and with illumination from the first subset of lights; selectively illuminating a second subset of lights arrayed in the structure; and collecting a second photograph of the plurality of photographs of the vehicle while in motion and with illumination from the second subset of lights; and subsequently activating additional subsets of lights and collecting additional photographs as the vehicle passes through the structure.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 12A-12D are photographs of the strobe lighting system positioned behind various sections of the subtractive gray wall according to an embodiment of the invention;

DESCRIPTION OF THE INVENTION

Figure 1A:
FIGS. 1A and 1B are typical non-studio quality vehicle photographs.
Figure 1B:
Figure 2A:
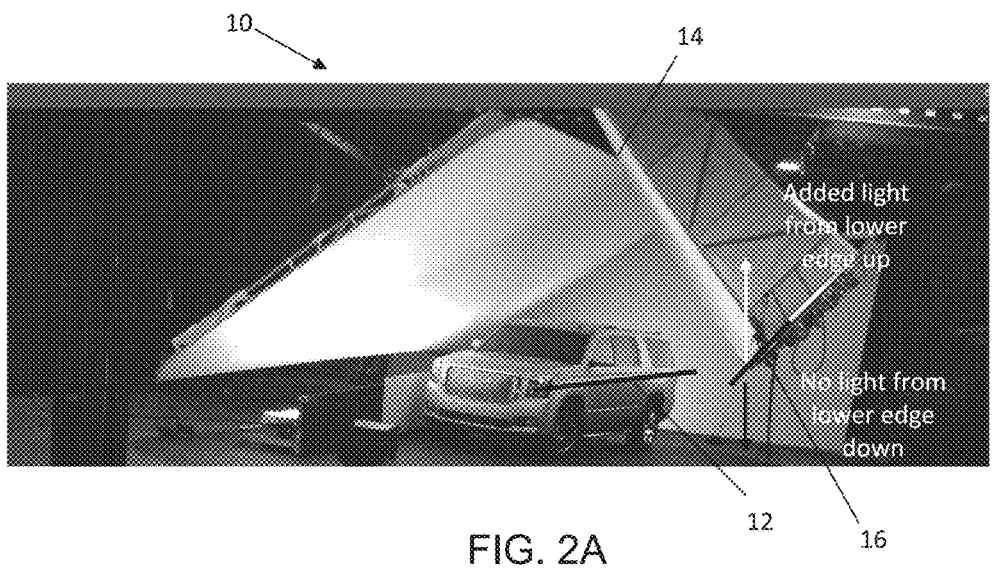
FIGS. 2A and 2B illustrate an existing studio configuration for generating a contrast break line on a vehicle with additive lighting.
Figure 2B:

The present invention has utility as a system for automatically photographing vehicles in a drive-thru structure where the passage of a vehicle triggers an automated process that captures a series of vehicle images, and uploads the captured images to a web template for display and recordation. In some inventive embodiments, a system is based on an IPAD® or IPHONE® or similar device that loads pictures directly to the web site. The images captured have controlled reflections from multiple angles and perspectives. A viewer is able to discern whether there are surface imperfections, scratches, and dents on a vehicle surface. Reflections are controlled in the structure or circular chamber with curved walls that are covered with a light scattering sheet material such as a white canvas or gray walls. In specific embodiments of the inventive image capture system, the lighting style used to illuminate the vehicle within the various structure or circular chamber configurations is a sunset horizon style of lighting, where the lights are hidden below the curved wall that may be gray or white so as to use a sunset style reflection on the vehicle surface through subtractive lighting. A sunset style reflection refers to a hot horizon line on the vehicle with a rapid fall off (i.e., a sunset shot).

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the inventive drive-thru structure photographic booth provide a photography stage with horizontal lighting that may be configured as subtractive lighting that utilizes optical tracking to trigger cameras and camera groups and associated lighting elements for multi-camera sequenced photographs of a vehicle as the vehicle is travels through the structure stage. The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer. Additionally, in certain inventive embodiments, at least one camera is placed behind a shutter. In still other embodiments the shutter is color and texture matched such that the shutter when closed visual fades into the background. In still other embodiments, the photographs are manually retouched or retouched by a program to minimize background defects. In still other embodiments, an alpha-numeric code or radiofrequency code associated with a vehicle is read automatically and associated with the resulting photographs. As a result a vehicle in a structure is moved continuously while being photographed. In other embodiments of the present invention, the vehicle is stopped and manually or automatically photographed.

Embodiments of the inventive drive-thru structure photographic booth allow for a complete set of multi perspective high quality vehicle images to be obtained and recorded into a template in less than 90 seconds, and in some instances in approximately 5, 10, or 15 seconds. Any employee moving a vehicle from point A to point B can drive through a linear booth, such as during vehicle delivery, moving into and out of a body shop or detailing shop, or moving the vehicle into position for auction. Thus, by the time the subject car is returned to its parking spot, the car is already available for sale online based on uploaded images and VIN uploaded information. The rapid processing time of the inventive drive-thru structure booth provides images that are equivalent to existing photographic staging methods that take several minutes to several hours obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive drive-thru structure photographic booth may utilize radio frequency identification (RFID) tags to identify and record vehicles as the vehicles are processed through the system. The RFID may be related to the vehicle identification number (VIN) of a vehicle to be processed. Information related to the vehicle, such as vehicle make, model, body style, and color encoded in the VIN may be used to automatically adjust lighting, the height and/or angle of the gray wall to optimize photographic conditions, as well as camera height, zoom, and camera placement/position for a subject vehicle to be processed. Knowing the color and vehicle style may automatically adjust the optical tracking camera for better tracking results. Through control of lighting and camera firing sequence, the driver of a vehicle is virtually invisible as a result of being hidden by glass reflection. Further information that may be related to the RFID may include a dealership setting that may also indicate which dealer the vehicle is being shot for, and incorporate that dealer's specific preferences such as lighting style, file size and format, number of photo shots and angles to be recorded. RFID information may also be used to project text onto the background of the shot or overlay text onto the file during processing, such as price, dealer name, vehicle specifications, millage, etc. In a manual booth embodiment, knowing the make and model number could automatically tell the photographer where to stand and what pictures to take. Embedded LED lights in the walls and floor of the booth, or a single overhead theater tracking light may direct the photographer where to stand to take a picture. As a result of preset angles and lighting, high quality images are collected in a fraction of time compared to an individual vehicle photo-session. Each photo would trigger the next light. The number of shots and positions in some inventive embodiments are determined by the RFID and data base information. Utilizing the optical tracker of embodiments of the invention, the program of where and how to shoot can be obtained by watching and recording a "real" photographer shoot a vehicle of similar body style.

Figure 8A:
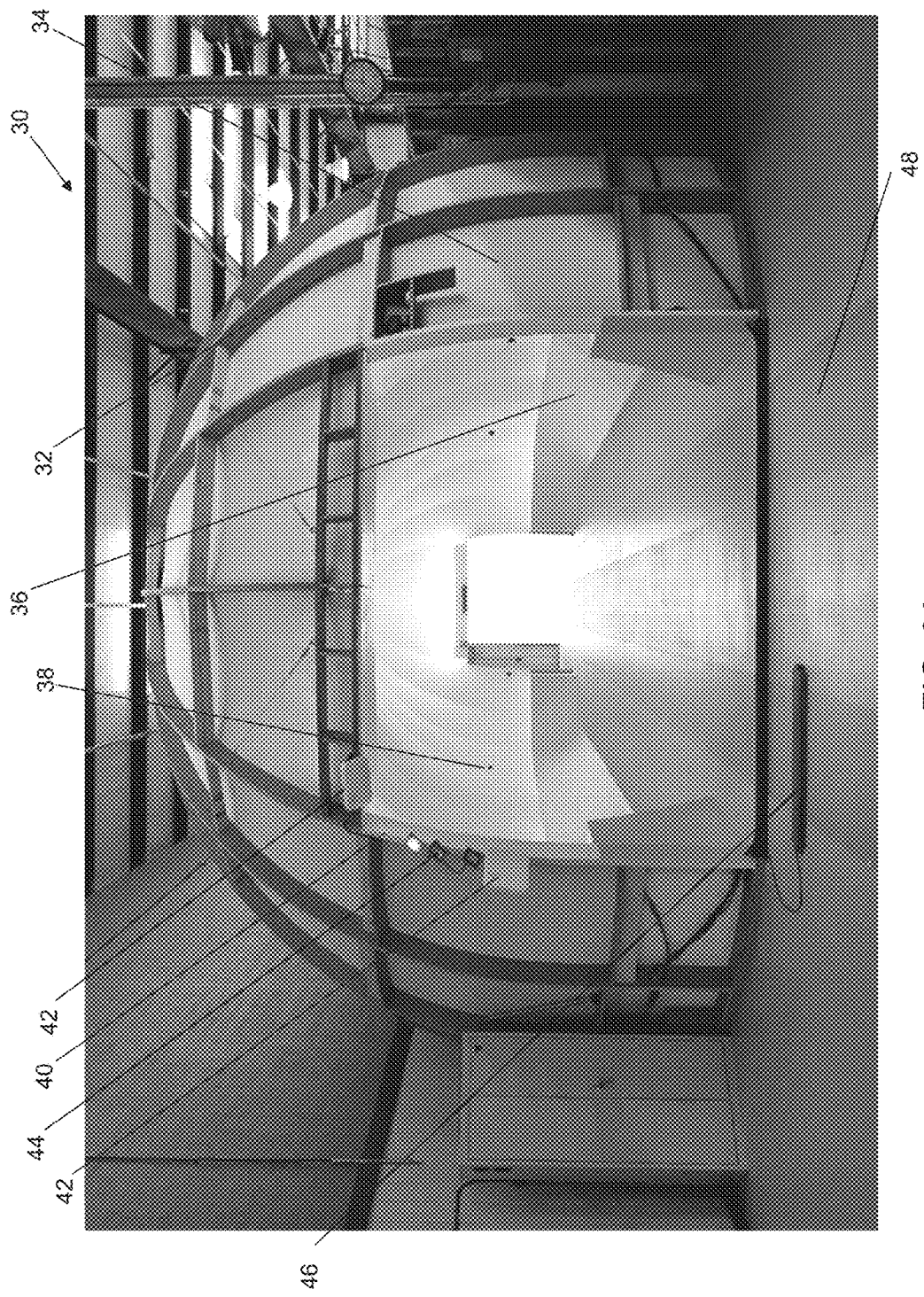
FIGS. 8A and 8B are photographic views of the vehicle entrance to the drive-thru structure of FIGS. 5A-5C according to an embodiment of the invention.
Figure 8B:
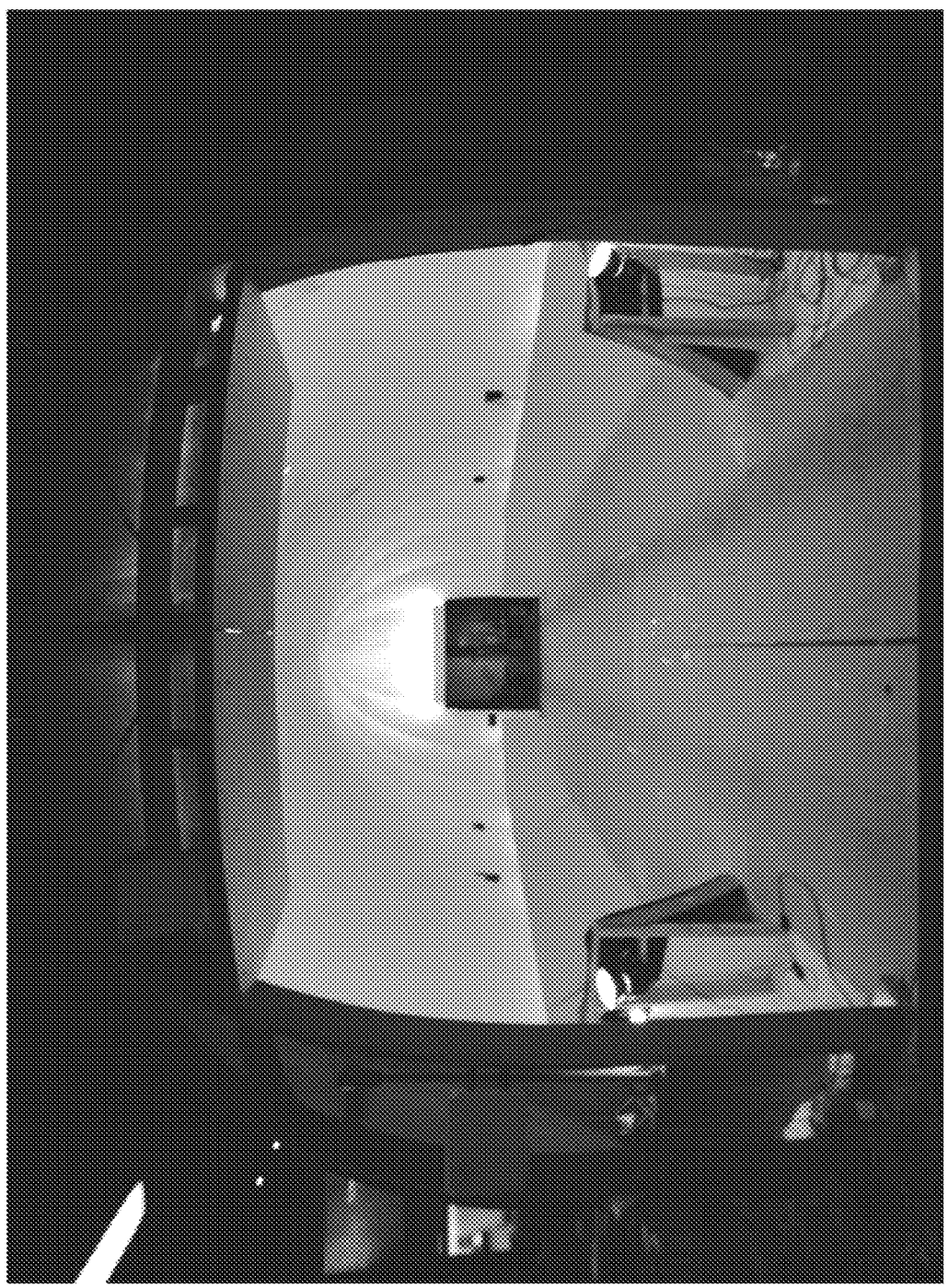

Referring now to the figures, an embodiment of the inventive drive-thru structure photographic booth is shown generally at 30 in FIGS. 8A and 8B. The structure booth 30 is constructed with a frame 32 with a canvas 34 attached to the frame. The dome shaped roof is used in the present invention in certain embodiments to preclude secondary reflections that negatively effect image quality. RFID readers 42 are mounted at the entrance 40 to read the identification tag associated with a subject vehicle. The driver of the vehicle in some embodiments may have an RFID name tag to track who shot the images or to monitor productivity. Also mounted at the entrance 40 are a series of driver feedback lights 44 such as red and green lights. In some inventive embodiments, the entrance 40 has a covering cloth to create a uniform background in front corner camera shots having the entrance 40 in the background thereof. In a specific embodiment, a blue light indicates that the booth is ready for a vehicle to accept a vehicle. A green light indicates a successful RFID read and drive through. A bad RFID read and the indicator light goes red. If the vehicle passes through the booth too quickly, a red light also appears. The indicator lights may also be position at the exit of the booth to provide feedback to the driver. Pressure sensor strip 46 activates the system when the vehicle tire runs over the sensor strip 46. Painted guide strips 48 provide a visual path for the driver to proceed through the structure booth 30. A physical threshold may be positioned at the entrance 40 to help the vehicles setup for a perfect idle through. The driver taps the gas pedal to get over the threshold bump, and the idle on most vehicles will be 5 miles per hour to move the vehicle through the structure booth 30 at a steady speed. The structure booth 30 is energy efficient. In terms of power distribution, an 8 meter long system should draw 200 to 400 amps, however less than 80 amps are typically drawn in operation. Specially sequenced relays bring each of the power zones up one at a time thereby stopping high in rush current. A number of power zones ranges from 1 to 20. The lighting system, to be described in greater detail below, typically has between 20 and 100 strobes, while in specific embodiments, between 40 and 80 strobes. In the exemplary embodiment depicted in the figures 52 strobes are arrayed in set positions to facilitate the full set of photographs. These strobes operate at 2-10 amps are load balanced so that when each zone fires only fraction of the power load is needed. The system boots up in a fixed sequence for reliability as follows: computer, universal serial bus (USB) extension power, camera power up one at a time, shoot all cameras in defined sequence, check to see if all image files exist (nine files in present embodiment), if yes—run remaining boot up script—if not, restart.

Figure 4A:
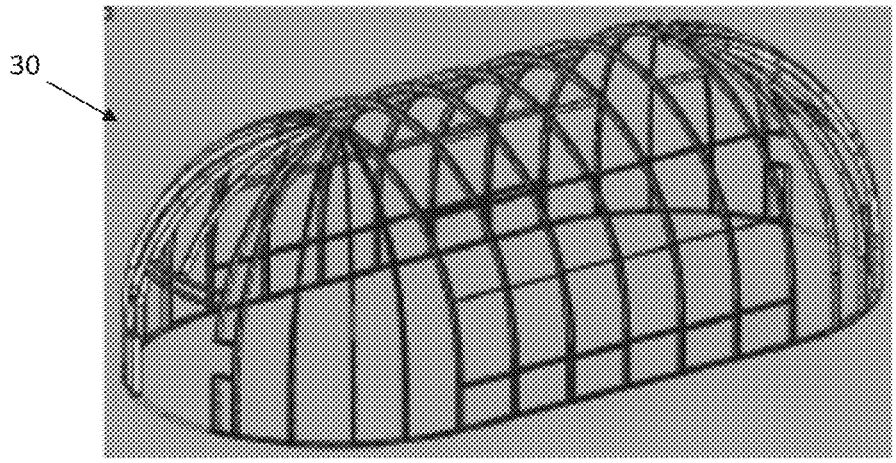
FIGS. 4A-4C are perspective views of a frame for a drive-thru structure according to an embodiment of the invention.
Figure 4B:
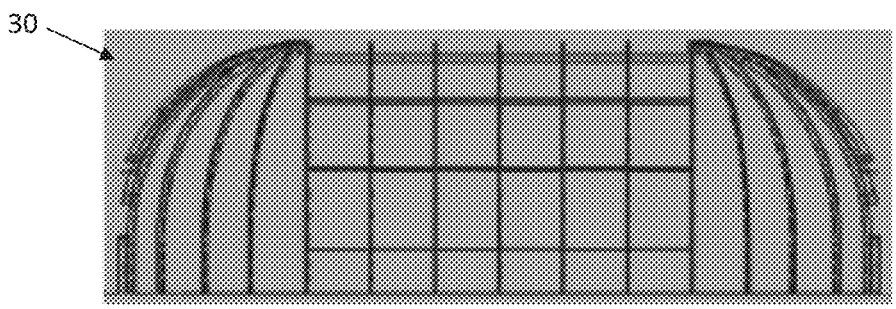
Figure 4C:
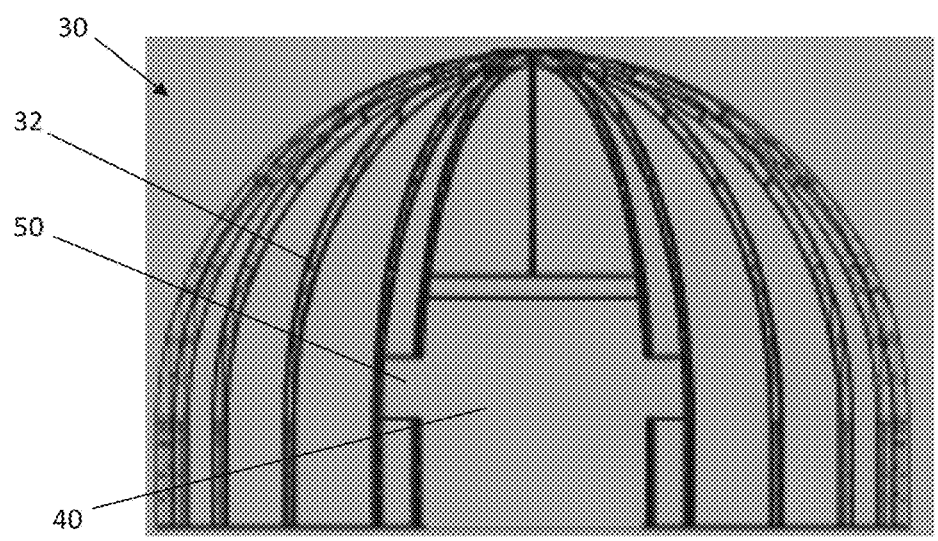
Figure 5A:
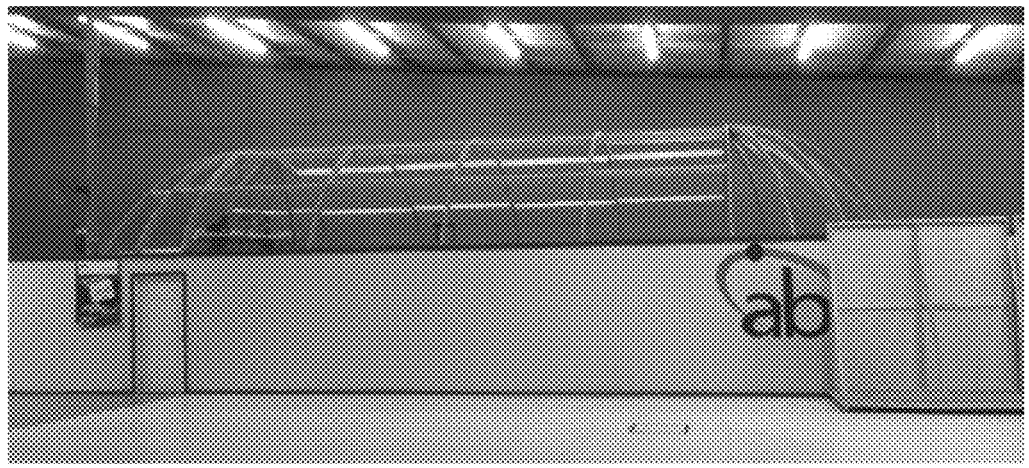
FIGS. 5A-5C are photographic views of a frame being constructed for a drive-thru structure according to an embodiment of the invention.
Figure 5B:
Figure 5C:
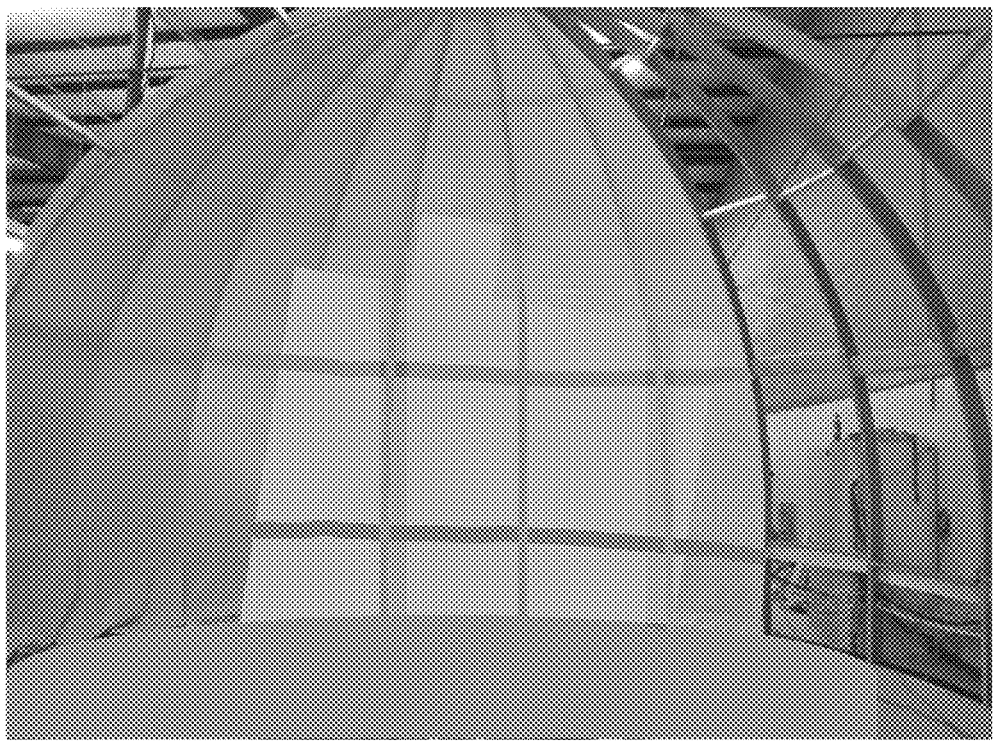

FIGS. 4A-4C are computer aided design drawings of the frame structure 32. As shown in FIG. 4C, ears 50 are made in the entrance 40 to accommodate side mirrors extending from vehicles entering the structure booth 30. FIGS. 5A-5C show the construction of the booth 30 and attachment of the canvas 34 to the frame 32. The frame 32 may be precision cut (CNC) and pre-drilled to allow for a simplified and precise installation. The frame may be made of wood, composites, aluminum, etc. In an embodiment (not shown) the structure may be made of prefabricated pieces of fiberglass or Styrofoam blocks, such as are made for ray domes or radial antenna domes. The heavy canvas skin 34 eliminates the need for drywall and sanding at the drywall seams. In an embodiment the canvas may 34 may be stapled to the frame 32, with the staples covered by a painted patch to hide the staples and the seam. The drive-thru structure photographic booth 30 is amenable to being disassembled and moved as required.

Figure 3A:
FIGS. 3A and 3B illustrate an existing studio configuration for generating a contrast break line on a vehicle with subtractive lighting.
Figure 3B:
Figure 6A:
FIGS. 6A-6C are photographic views of a subtractive gray wall under construction for use in the drive-thru structure of FIGS. 5A-5C according to an embodiment of the invention.
Figure 6B:
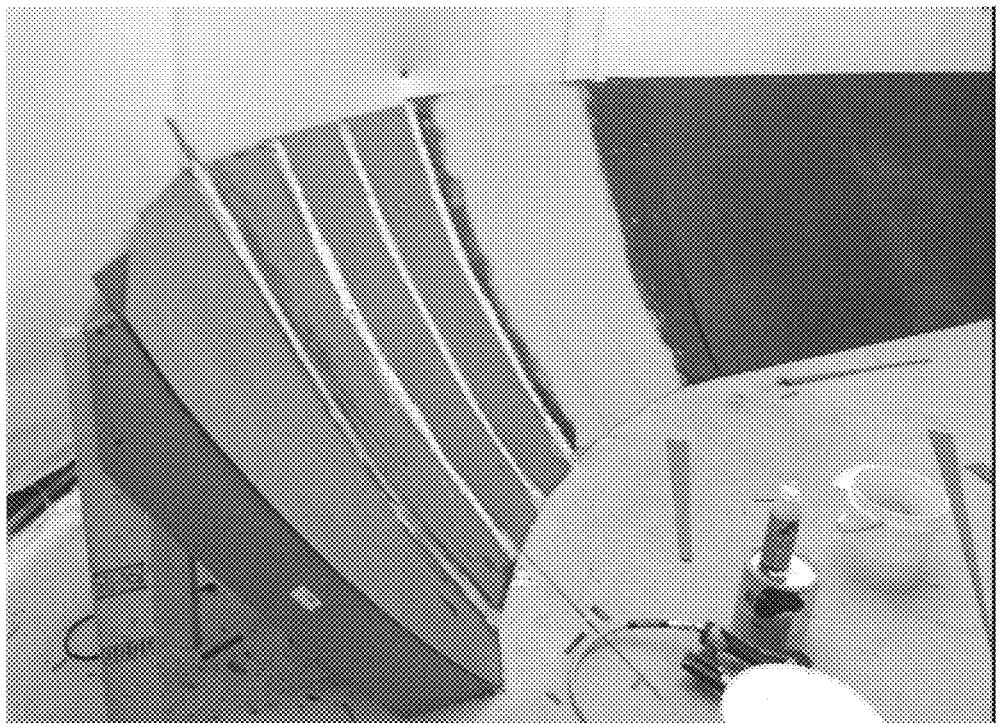
Figure 6C:

Embodiments of the inventive drive-thru structure employ hidden lighting elements behind a horizon wall hip wall in the form of a gray wall to create a contrast break on the side of the vehicle with subtractive lighting. The subtractive lighting method produces a booth with all bounce lighting and 100% controlled reflections on the vehicle surfaces. No reflections of the light sources or of the lighting fixtures themselves show up in the vehicle surface paint. Embodiments of the structure booth form a large smooth white room, and then subtracting that white from the reflections using the gray wall. A totally white room would make a subject vehicle look flat and dull with no contrast, and there would be no accent of the vehicles natural body lines. The inventive drive-thru structure employs an innovative continuous 270 degree gray wall or 360 degrees in the case of the round stage wall (FIGS. 22A-22D), as shown in FIGS. 8A and 8B, to produce a clean horizon line in the vehicle's reflections at all angles about the perimeter of the vehicle. The shape of the structure booth 30 wraps light around the front and rear of the vehicle while also wrapping the horizon reflection around the vehicle, which allows the vehicle to be photographed from multiple angles and still have the same high end look without the need to adjust the lighting or gray wall for each shot for a given subject vehicle. A clean top edge of the horizon wall causes a crisp reflection in the vehicle, and is the break point between highlight and shadow. It is appreciated that 270 degree or anything that is not a short straight run that is commonly used in car studios. The use of a 270 degree gray wall differs from a typical professional studio (see FIG. 3) where the "gray wall" is usually a strip of cloth hung on a pole and positioned between the car and the light source, and is only used on one side of the car being shot at that time and would be positioned based on what works for a single camera angle. The gray wall used in embodiments of the invention is unique in the fact that the gray wall is a fixed hard structure that is optimized to give the desired reflection on a full range of vehicle shapes and sizes from multiple camera angles. Thus while the viewing angle may change, the lighting style remains consistent across all viewpoints. The gray wall may be built from materials such as wood, composites, metals, etc., and may be in a fixed position or repositionable. FIGS. 6A-6C illustrate the construction of an embodiment of the gray wall. The movement of the horizon gray wall could happen automatically or manually. For example after reading the RFID tag of a vehicle, the booth knows the make and model of the vehicle that is in the booth. The horizon gray wall could automatically be adjusted in height and angle to put the perfect body line reflection into any subject vehicle. Furthermore, the gray wall can also take into account that manufactures or retailers' preferences as to how they prefer the body styling and lighting style to interact.

Figure 7A:
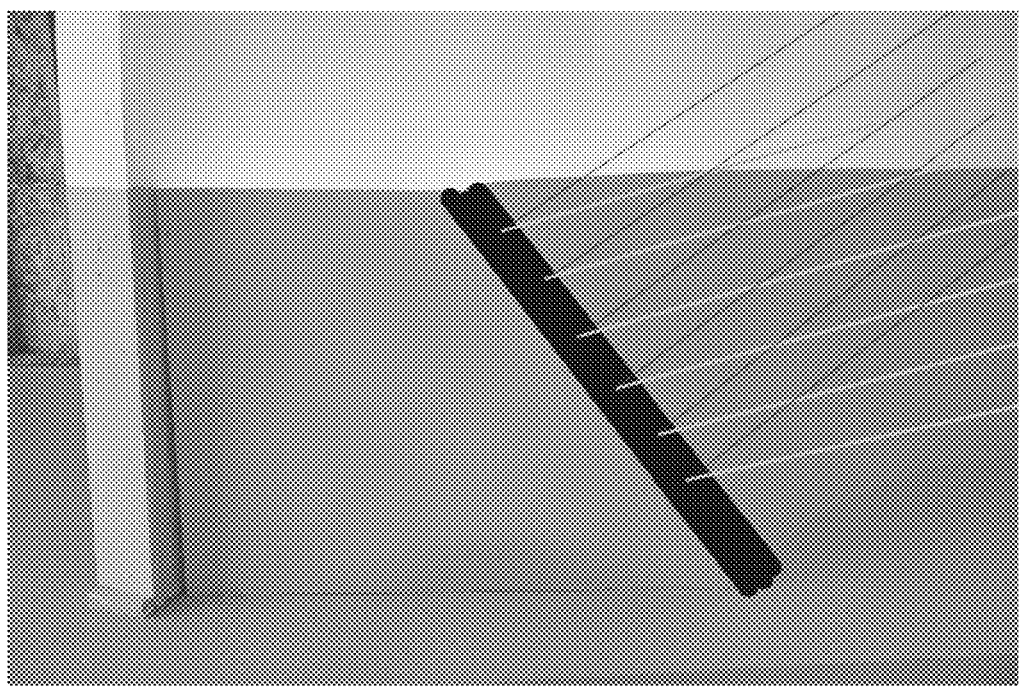
FIGS. 7A and 7B illustrate the difference in light reflection between a straight and curved subtractive gray wall, respectively according to an embodiments of the invention.
Figure 7B:
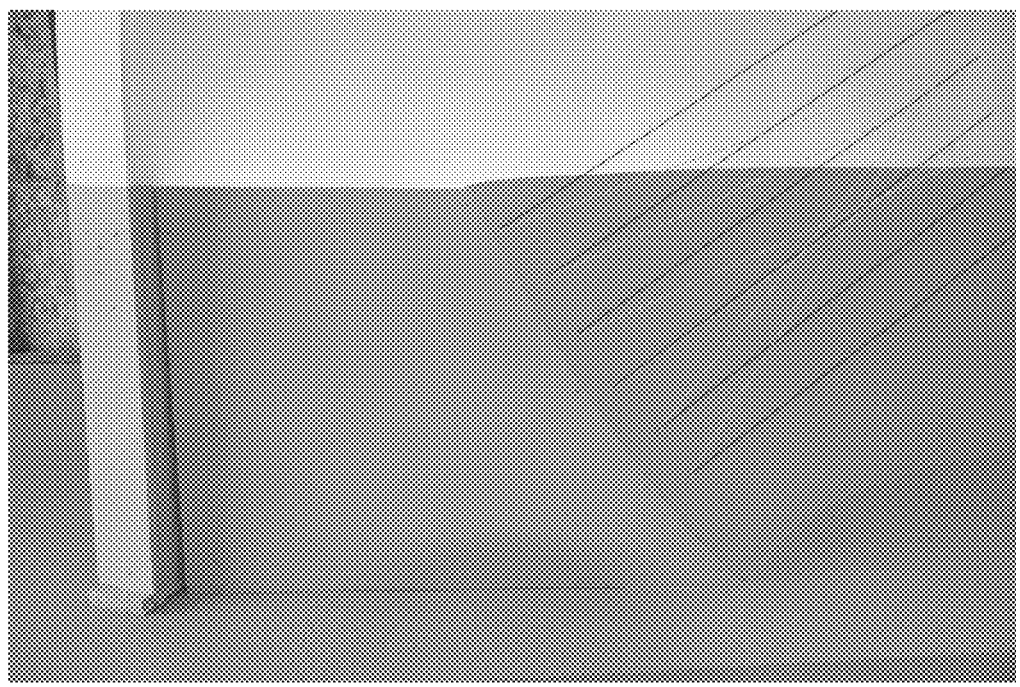
Figure 9:
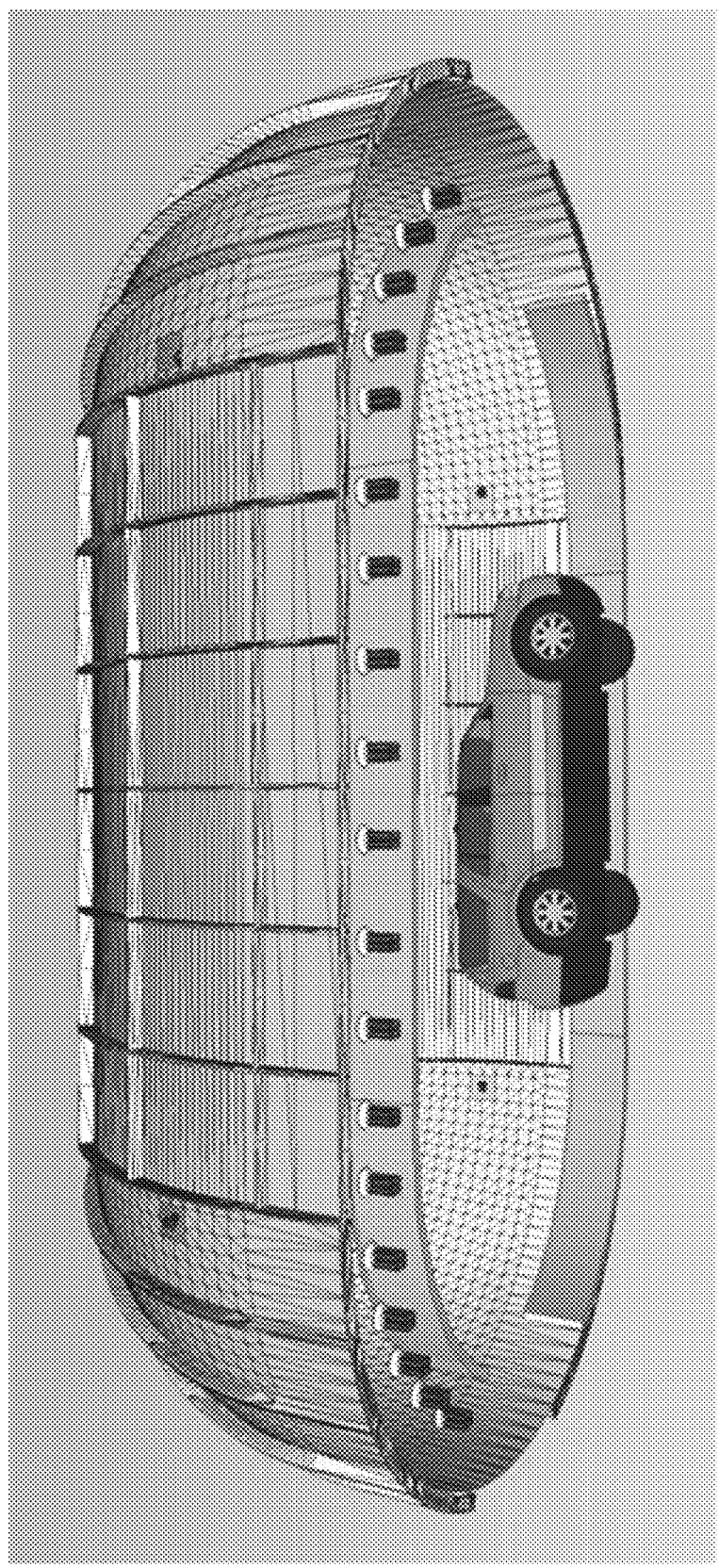
FIG. 9 is an exploded perspective view of the drive-thru structure of FIGS. 5A-5C according to an embodiment of the invention.
Figure 10:
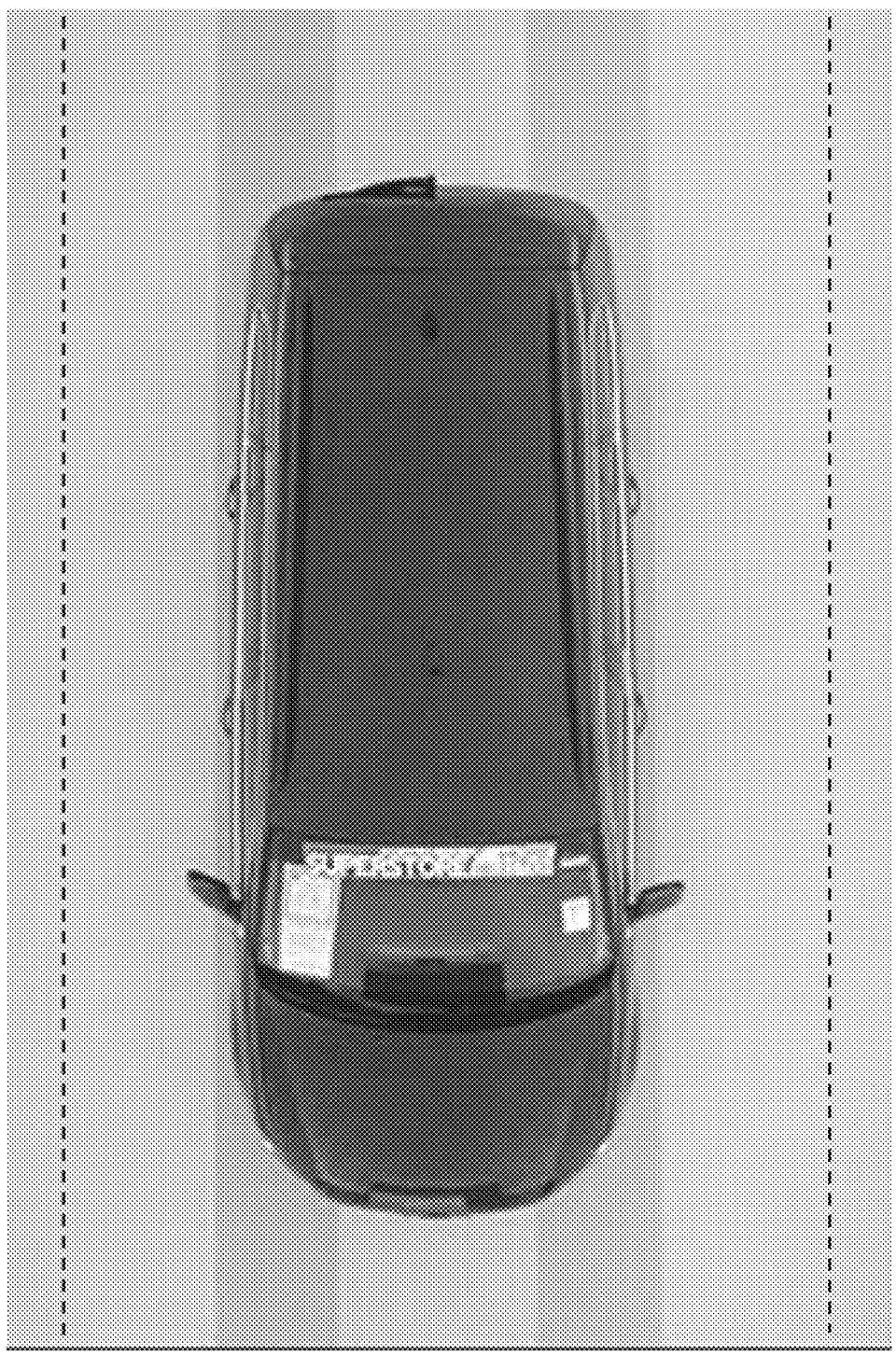
FIG. 10 is downward photograph showing where the subtractive gray wall blends into the floor of the drive-thru structure of FIGS. 5A-5C according to an embodiment of the invention.

Embodiments of the inventive drive-thru structure photographic booth may use a curved horizon wall that both has a curved face surface and also curves around the front and back of the vehicle. As best seen in FIGS. 7A and 7B, the angle of the horizon wall provides bounce lighting that provides fill for the lower part of the vehicle. It is appreciated that a straight hip wall, a slant wall, a radius wall are all operative herein. While it would be much easier to build the horizon wall as a simple vertical wall or as a slanted wall, the use of a curved face affords the lower part of the car some bounce fill light while not allowing the light to produce surface sheen on the wall and back to any of the cameras. If the wall were merely a slant board (FIG. 7A) some camera angles would pick-up glare that would also show up as undesired reflections in some of the vehicles surfaces. As shown in FIG. 7B, as light bounces off the curved gray wall surface the light is redirected at many angles and thus never builds up into a sheen, and still provides bounce light for the lower area of the vehicle. The radius of curvature of the gray wall panels may be adjusted depending on the desired lighting effect. In embodiments of the inventive drive-thru structure booth, the wall is also painted so that the wall matches the floor color and tone as seen by the cameras. The blending of the wall with the floor is shown in the top down view of FIG. 10, where the dotted lines demarcate the interface between the horizon walls and the floor of the drive-thru booth. Because the horizon wall is on a different plane and has a curved surface, the wall actually needs to be painted one tone lighter than the floor to appear as the same tone to the cameras. This can be seen best in the overhead top down shot in FIG. 10. The horizon wall structure is also used as a place to mount and conceal the lighting, as best seen in FIGS. 12A-12D, as well as the exploded drawing of FIG. 9. From the lighting mounted position, the lights brighten the upper portion of the dome with soft light and brightly lights the portion of the wall right above its top edge of the gray wall creating the distinctive sunset like reflection in the vehicles paint. By creating an empty space between the back of the gray wall and the dome wall the strobe heads can be pointed downward so the light bounces off the floor and then up the wall, which significantly makes the beam of the light wider and gives a softer quality of light, while also dramatically cutting down on the amount of space needed between the gray wall and the structure wall. In a specific embodiment, the top of the gray wall is just 20" away from the structure wall. It is noted that the versatile 270 degree horizon wall concept will work equally well in still photography, video or three-dimensional (3D) rendering.

It is appreciated that computer-generated imagery (CGI) vehicle rendering is also accomplished with the present invention lighting angles. If all the measurements are the same and the lighting values are the same then the virtual vehicle would look pretty much the same as a real vehicle in that environment. Even easier would be to shoot an high-dynamic-range imaging (HDRI) lighting map from the center of an inventive rotary stage. In simplest terms, a HDRI lighting dome is a sphere where the inside has a 360 panoramic images projected upon it and thought of as huge stained glass dome where the glass looks exactly like the room as view from it's center and has an infinite amount of light being projected through it. When a reflective 3D object like a car is placed in that virtual environment, then the reflective 3D object will reflect the lighting setup exactly as it would in real life. In this example a series of photographs simulate a virtual room space.

Figure 11A:
FIGS. 11A and 11B are photographs showing source lighting positioned above the entry and exits of the drive-thru structure of FIGS. 5A-5C according to an embodiment of the invention.
Figure 11B:
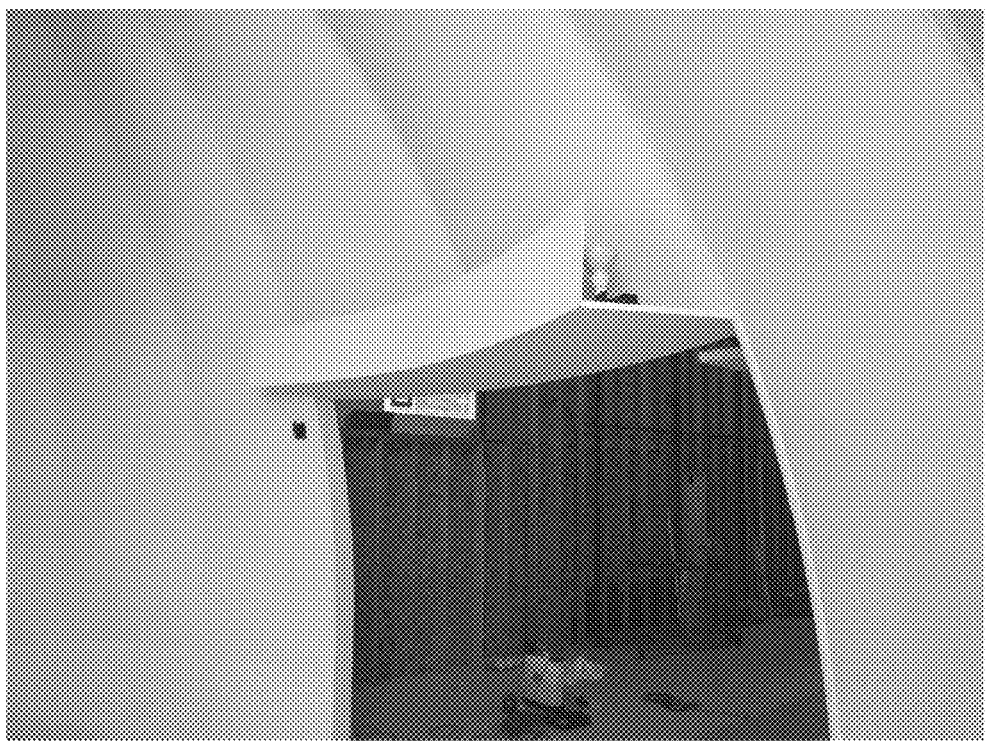
Figure 12D:
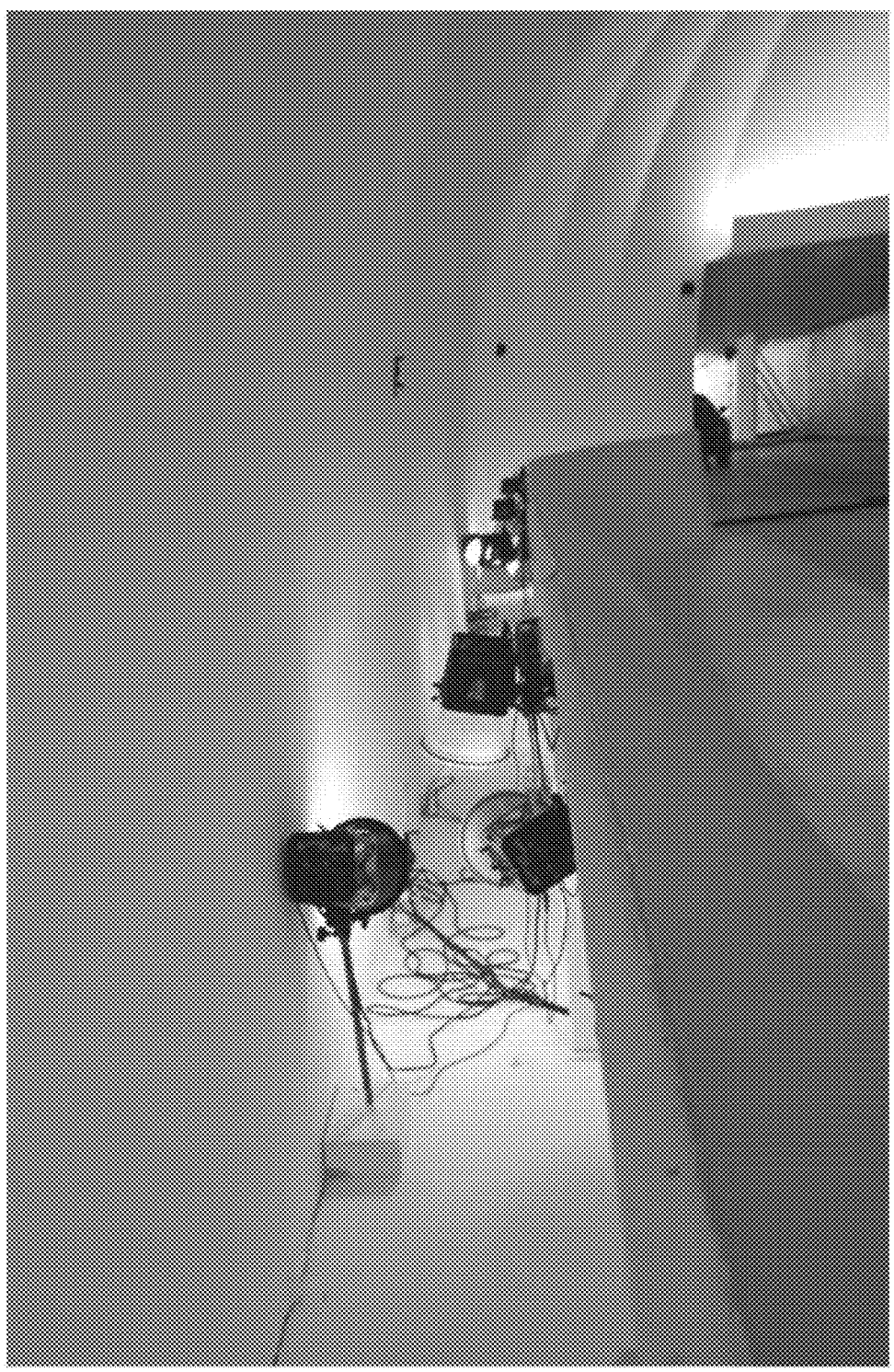

In embodiments of the drive-thru photographic booth, the lighting is setup in zones that relate to each camera position. In a specific embodiment, there are 10 to 30 strobe heads, and in some embodiments between 16 and 22 strobe heads (Base lighting) that fire for every triggering position as the vehicle moves through the drive-thru photographic booth. The base lighting is used to provide overall fill lighting in the booth, create the background tone, and to hide the canvas seams. Each camera position has its own decimated strobe group. The strobe group, when added with the base group has been optimized to give the best lighting for that angle of view or zone. One of the key points of this zone system is that the subject vehicle can be brightened without brightening the background. That is to say if all strobes fired at the same time then the only way to brighten the car would also brighten the background. On overly white background will produce haze or flare in the photographs. It should be noted that the base strobe heads are turned all the way down, and this is what allows the base strobes to recharge very quickly and be ready again when the next zone needs to fire. As can best be seen in FIGS. 12A-12D, in a specific embodiment the strobe lights are color coded as black, yellow, and white. The white strobe lights always fire at a trigger point as noted above as the base strobe, and the black and yellow strobes are near the same location but are associated with different cameras, so these strobes have different angles and power settings. As shown in FIGS. 11A and 11B, the addition of sconce lights over the doorways greatly improved the ability to accurately track the vehicle. The sconce lights do not affect the lighting, and are out of the framing of the cameras. The edge light on both side ends creates a reflection line at the front and back of the vehicle. The reflection lines allow the tracking camera to determine the outer edges of the vehicle more accurately. This lighting creates an edge reflection on the front and back of the vehicles as seen by the top down camera. This helps the tracking camera find the outside edges of the vehicle. When the image is exposed for the powerful photographic strobes these light do not show up in the vehicle reflection (too small a percentage of the exposure to be visible). It is appreciated that with infrared and/or 3D tracking system door sconce lights may or may not be used to modify lighting effects.

Figure 13:
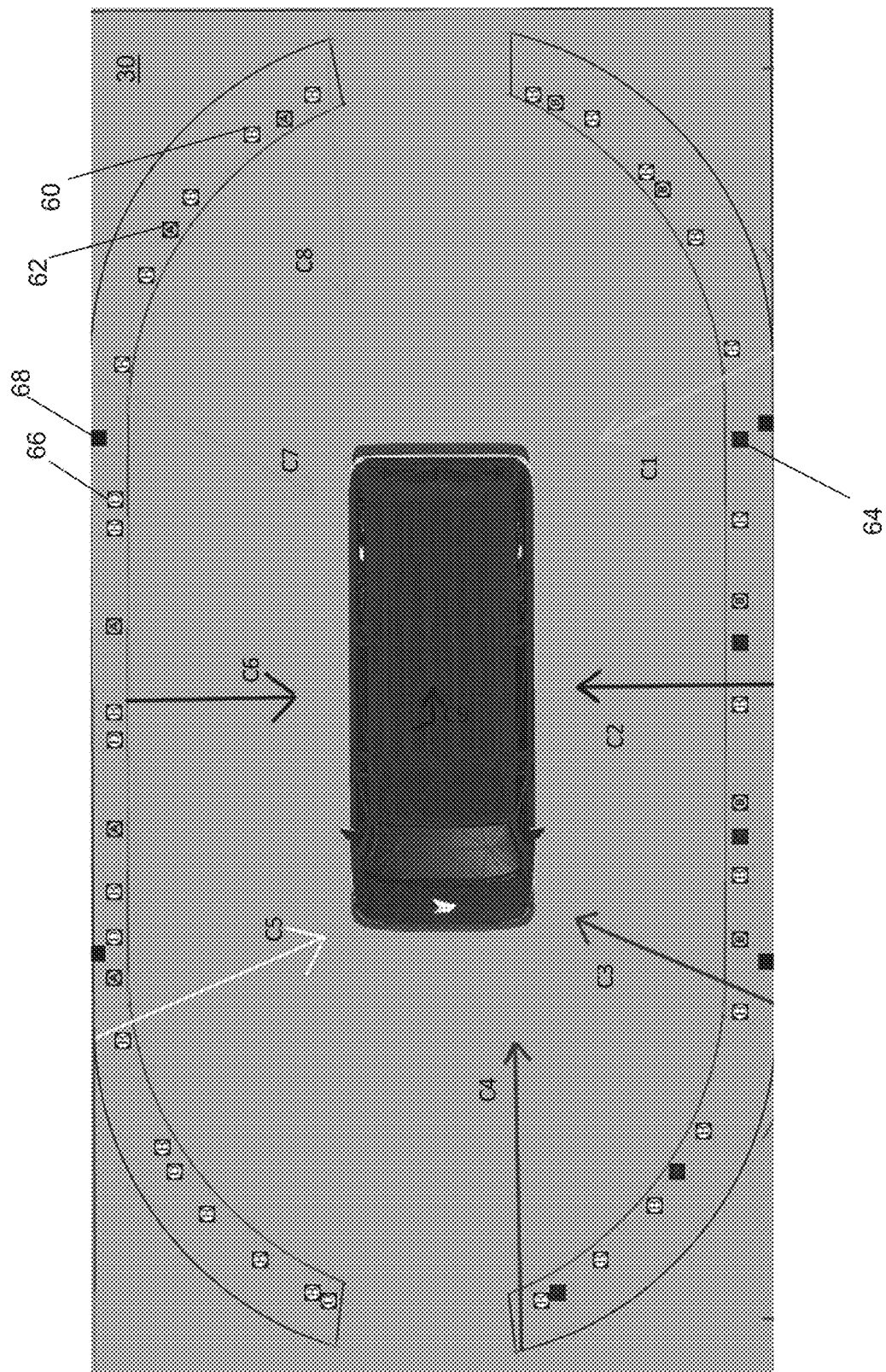
FIG. 13 is a schematic diagram showing the placement of strobe lighting groups and camera angles within the drive-thru structure of FIGS. 5A-5C according to an embodiment of the invention.
Figure 14:
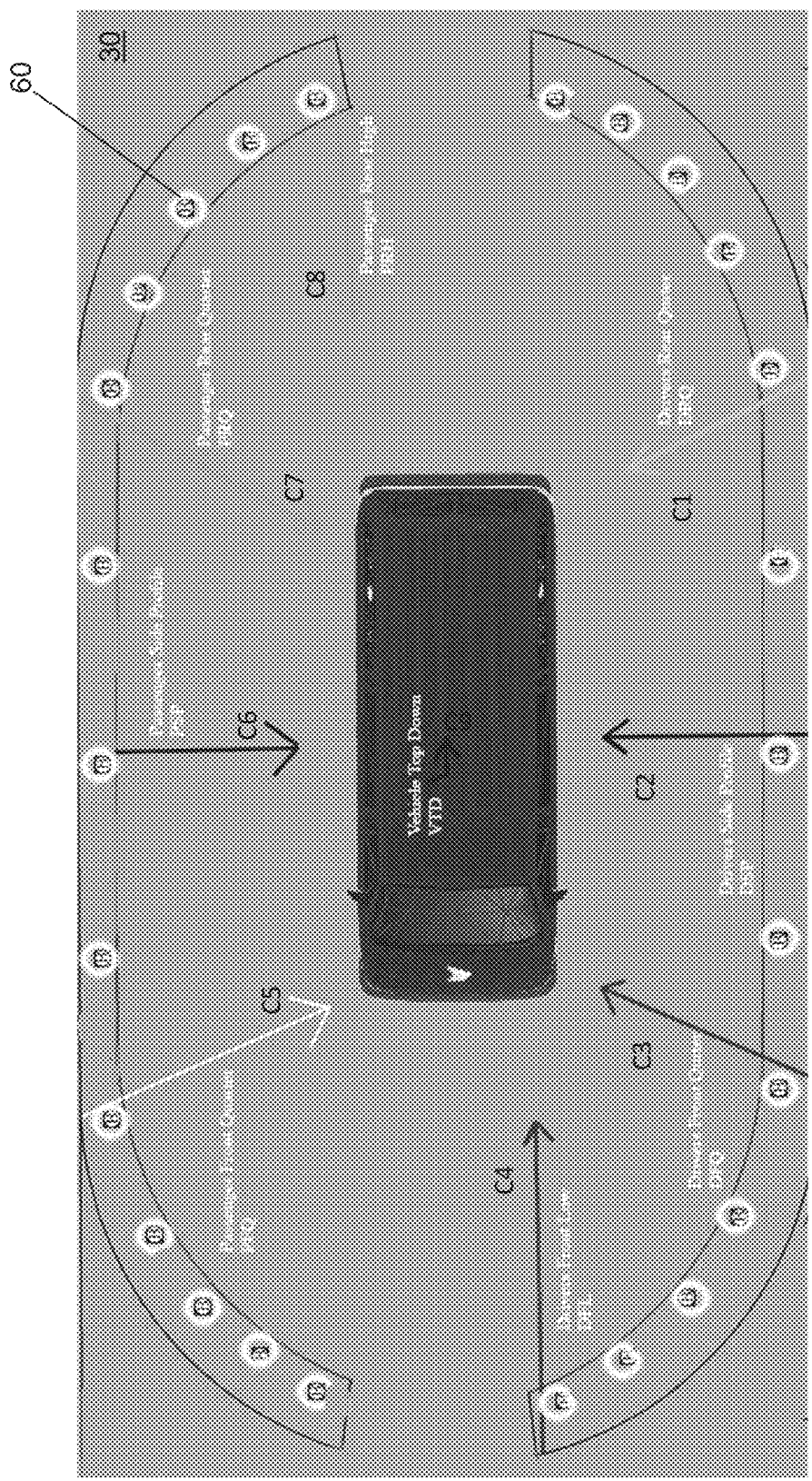
FIG. 14 is a schematic diagram showing that the base strobe lights (B) turn on and stay on while a vehicle is within the drive-thru structure of FIGS. 5A-5C according to an embodiment of the invention.

FIG. 13 is a schematic diagram showing the placement of strobe lighting groups and camera angles within the drive-thru structure 30 according to an embodiment of the invention. The arrows represent the nine cameras (C1 to C9) that image the vehicle as the vehicle travels across the drive-thru structure 30. There are twenty six base strobes 60 (letter B) that are placed at the seams of the canvas. Each of the nine camera groups has five to nine additional strobe lights in addition to the base strobes 60. As shown in FIG. 14 the twenty six base strobe lights 60 fire every time any other zone is also fired for the corresponding camera shot. The nine camera positions are defined as follows: C1—driver side rear quarter (DRQ), C2—driver side profile (DSP), C3—driver side front quarter (DFQ), C4—driver front low (DFL), C5—passenger front quarter (PFQ), C6—passenger side profile (PSP), C7 passenger rear quarter (PRQ), C8—passenger rear high (PRH), and C9—vehicle top down (VTD). In a particular example, the "base" strobes fire when any of the 6 lighting zones fire. The base strobes provide the general ambient lighting and flood the seam locations help blow them out to white. Even more exactly these base lights are divided into two groups of heads next to each other. Each head is doing the same thing, but by alternating which one head fires with the next zone, the first head has time to recharge before the vehicle reaches the next alternating zone. By way of example, Trigger point 1 fires:
Custom lighting zone 1 and base group A (drivers 3/4) 0.03 second delay
Custom lighting zone 2 and base group B (Passenger rear 3/4, Passenger rear high)
Trigger point 2 fires:
Custom lighting zone 3 and base group A (drivers profile, top down) 0.03 second delay
Custom lighting zone 4 and base group B (Passenger profile)
Trigger point 3 fires:
Custom lighting zone 5 and base group A (drivers front 3/4, Driver front low) 0.03 second delay
Custom lighting zone 6 and base group B (passenger front 3/4)

The base strobe lights 60 provide a base exposure for the room and define the base background tone. The base strobe lights 60 are placed at each seam point in the canvas so that the bright light helps wash out the seam and it's reflection in the vehicle. The gray wall top edge is only 20" from the outside wall and does not give much room to get the lighting angle such that the seams would be invisible, and would be required to come out another foot and point very flat at the seams. The base lights 60 are set to their lowest power setting so that they can fire and be ready to fire again in 0.08 of a second. At full power the base lights 60 take ½ second to recharge and would not be ready for the next trigger point if the vehicle is moving at 5 mph. Driving at faster speeds is possible but an entire second set of strobes would need to be added, and have the fire in an alternating manner to be ready when the next camera calls for base light. At that time each camera group had its own totally unique and isolated lighting positions. This is always the best case as each camera angle or group can be lit best far that viewing position.

Figure 15:
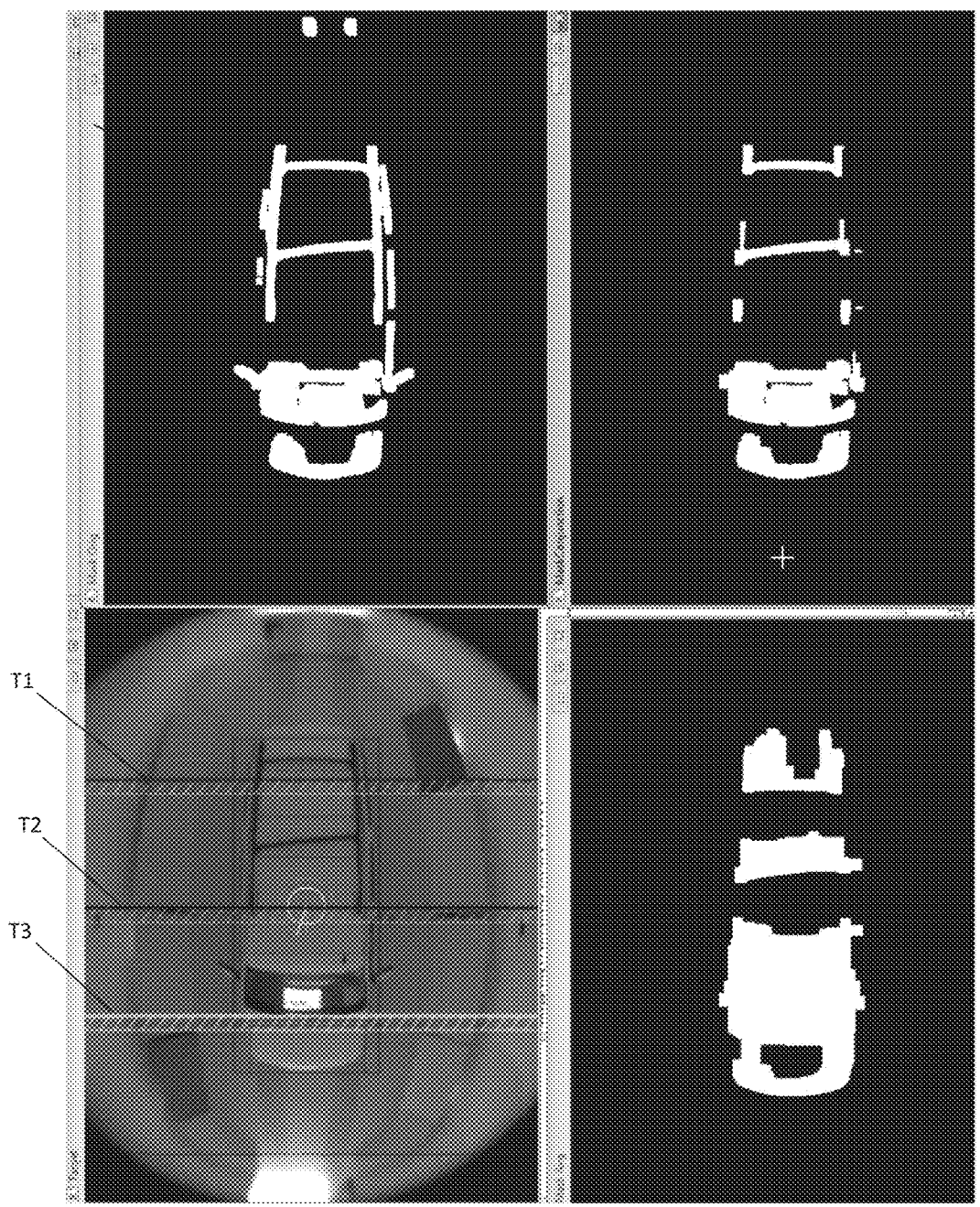
FIG. 15 is a screen shot of a computer monitor showing the visual output of an optical tracking system according to an embodiment of the invention.
Figure 16A:
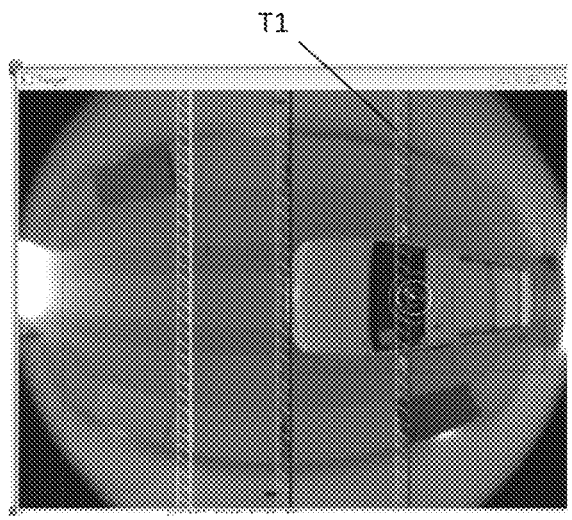
FIGS. 16A-16C illustrate the sequence of lighting and vehicle image capture when the vehicle reaches trigger point 1 (T1) within the drive-thru structure of FIGS. 5A-5C according to an embodiment of the invention.
Figure 16B:
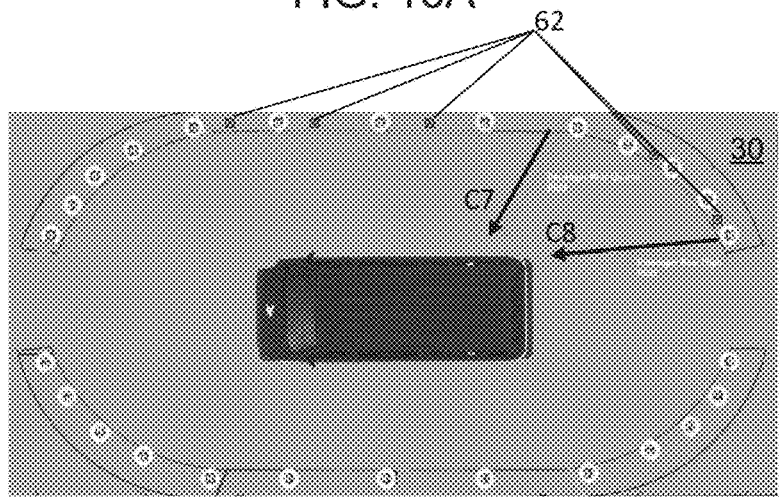
Figure 16C:
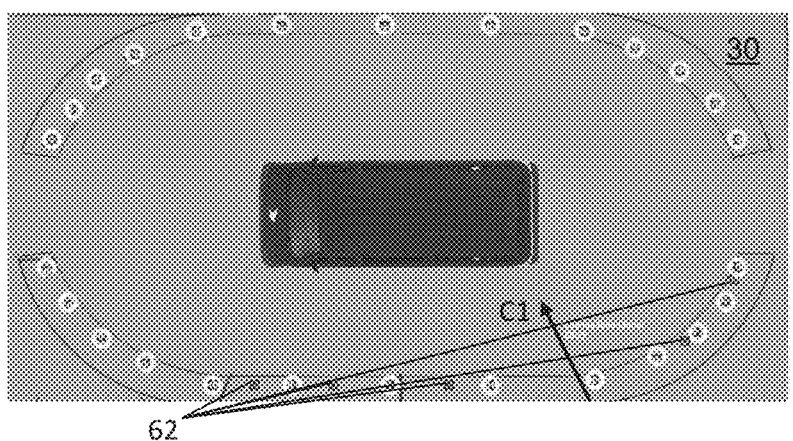

FIG. 15 is a screen shot of a computer monitor showing the visual output of an optical tracking system that allows for the automation of the image capture of a vehicle according to an embodiment of the invention. When the vehicle crosses the pressure pad 46 outside the booth 30, the tracking camera turns on and waits for movement. As the vehicle enters the interior of the booth 30, the tracker attempts to locate the vehicle and the center of the vehicle, and once located, the tracking program waits for the vehicle to cross one of the 3 points of predefined zones that are trigger points (T1, T2, T3). Once the vehicle center crosses the first trigger T1, the program executes that predefined action of code of: Wake camera group A, Fire camera group A, wait a predefined delay period, Fire strobe group A, and release wake and fire relays. This is shown in FIGS. 16A-16C which illustrate the sequence of lighting and vehicle image capture when the vehicle reaches trigger point 1 within the drive-thru structure 30. Once the pressure pad 46 has been crossed all cameras are put into wake mode. When the tracking camera detects that the vehicle has crossed the first designated line it triggers the trigger point 1 routine, and fires: camera 7—PRQ and camera 8—PHR. PRQ has a strobe sync cable attached to it, and PRQ fires the lights listed here as "A'" 62. All base lights are in slave mode and will fire any time they see another flash. All strobe heads other than the base fights are set to afford desired lighting for that camera or group of cameras, and have unique positions, angles and power settings. The base lights 60 light up the room and sets the background tonality. Individual camera group lights shape the vehicle and create the original equipment manufacturer (OEM) look. After a short delay of approximately 0.01 seconds, the camera 1—DRQ is fired with corresponding lighting 62. Subsequently, the wake and fire buttons are released, and the images are automatically downloaded.

Figure 17A:
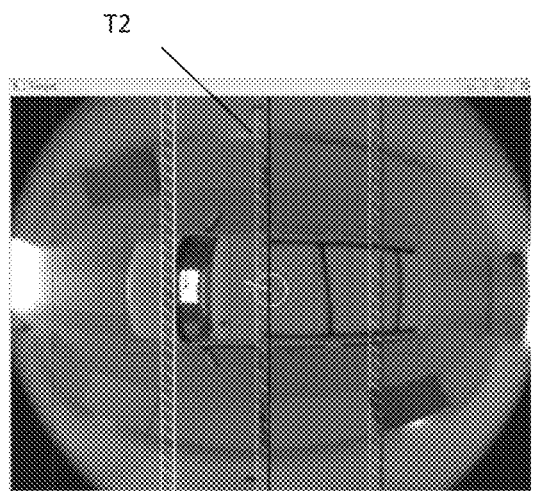
FIGS. 17A and 17B illustrate the sequence of lighting and vehicle image capture when the vehicle reaches trigger point 2 (T2) within the drive-thru structure of FIGS. 5A-5C according to an embodiment of the invention.
Figure 17B:
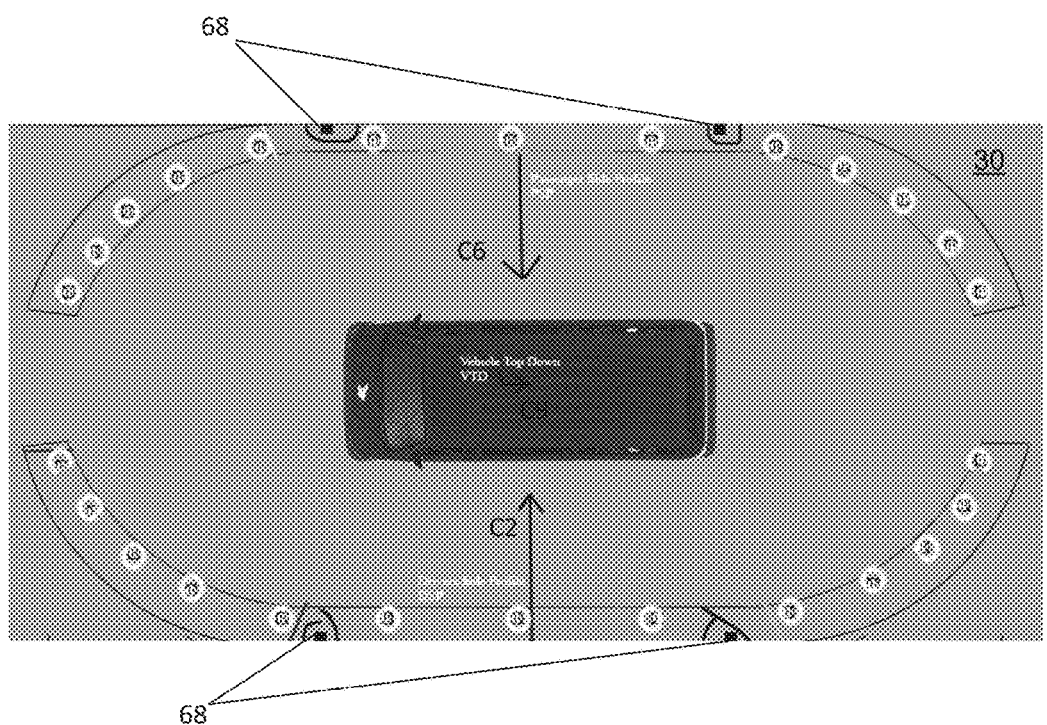

FIGS. 17A and 17B illustrate the sequence of lighting and vehicle image capture when the vehicle reaches trigger point 2 (T2) within the drive-thru structure 30. Camera 2—DSP, Camera 6—PSP, and camera 9—VTD are fired with strobe lights 68 activated. In an embodiment DSP and VTD are fired first, and after a 0.01 seconds delay the DSP is fired. The images obtained with these cameras are then downloaded.

Figure 18A:
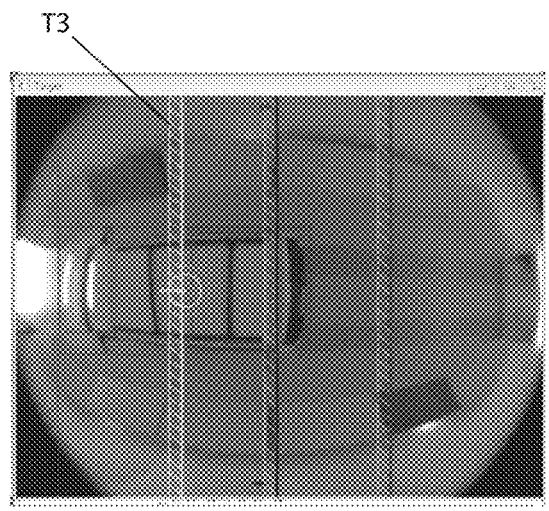
FIGS. 18A-18C illustrate the sequence of lighting and vehicle image capture when the vehicle reaches trigger point 3 (T3) within the drive-thru structure of FIGS. 5A-5C according to an embodiment of the invention.
Figure 18B:
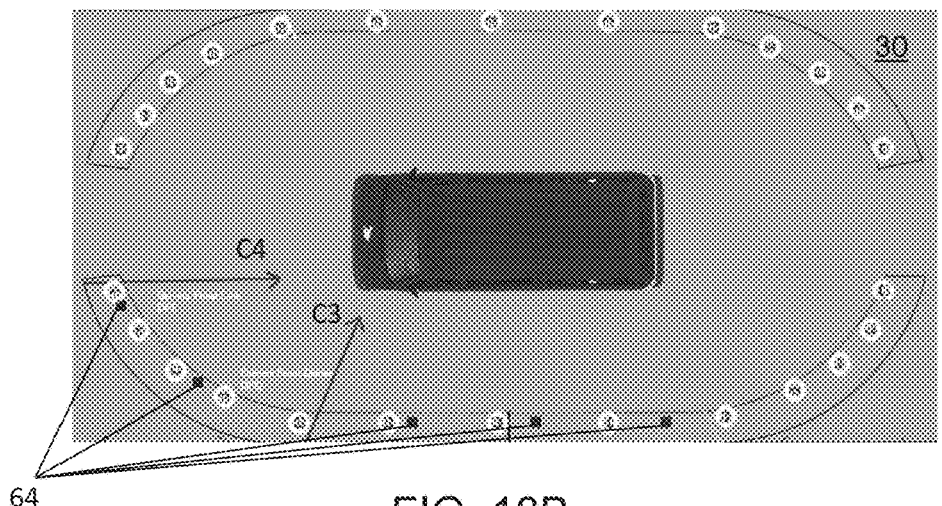
Figure 18C:
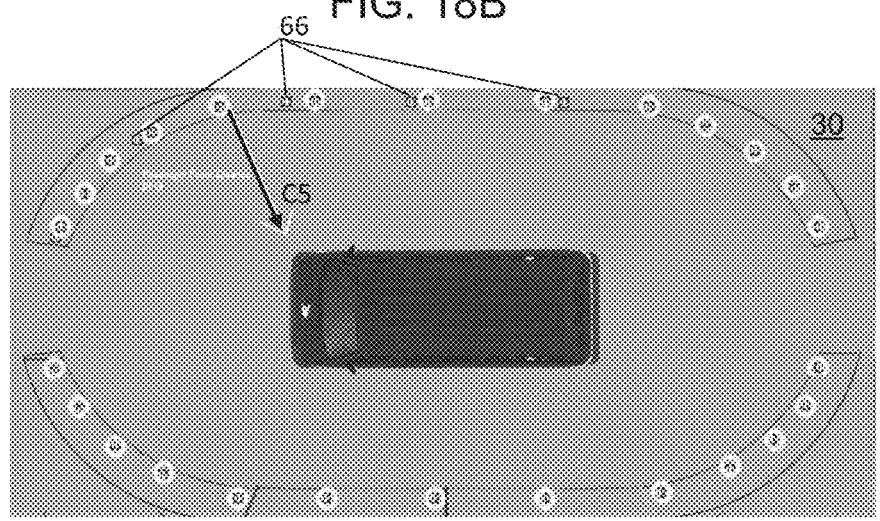

FIGS. 18A-18C illustrate the sequence of lighting and vehicle image capture when the vehicle center reaches trigger point 3 (T3) within the drive-thru structure 30. Camera 3—DFQ and camera 4—DFL are fired first with corresponding lights 64 as shown in FIG. 18B. After a 0.01 second delay camera 5 and corresponding lights 66 are fired as shown in FIG. 18C. The images obtained with these cameras are then downloaded.

Figure 19:
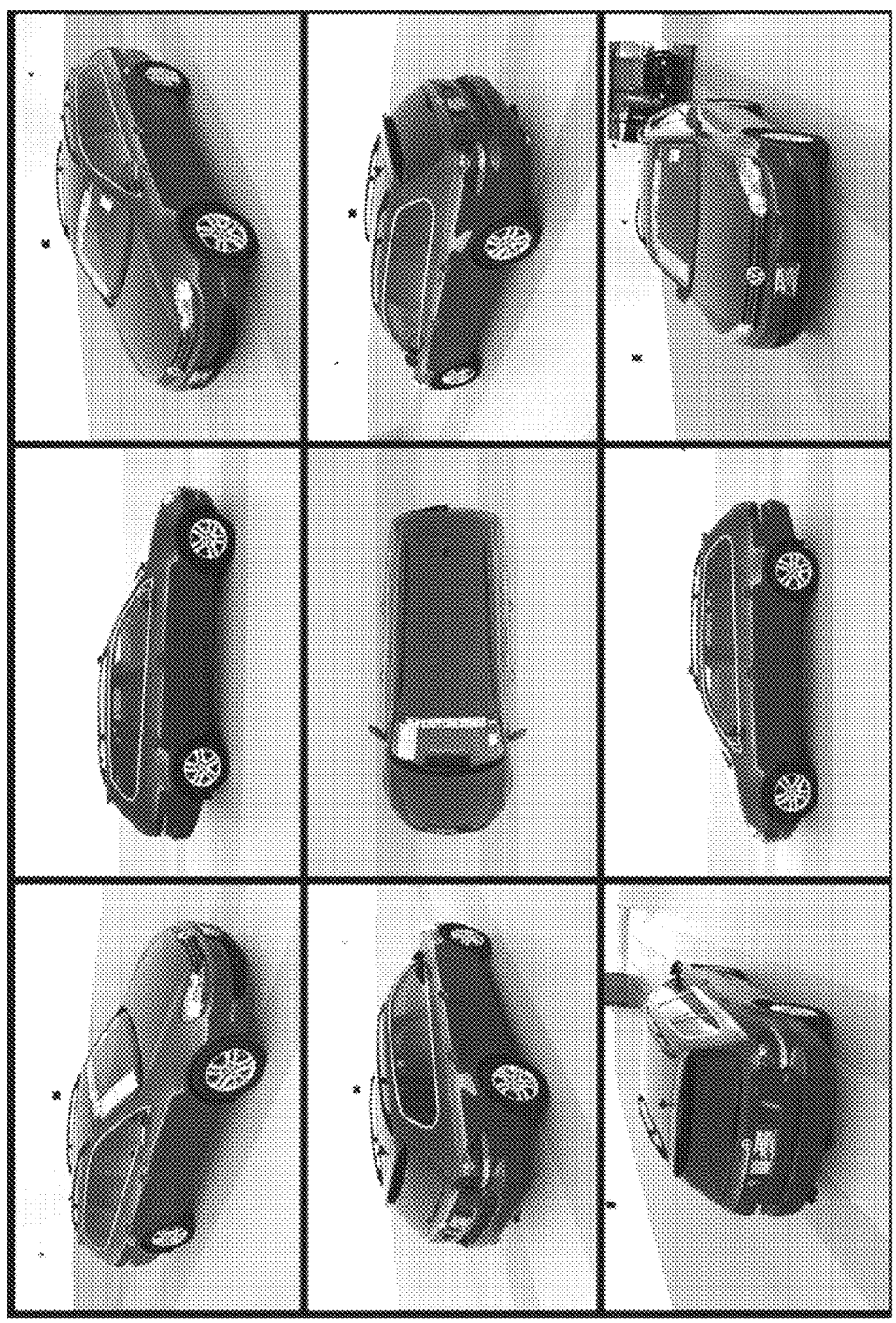
FIG. 19 is a series of high quality photographs obtained within the system according to embodiments of the invention.

FIG. 19 is a series of high quality photographs obtained within the system of the structure booth 30 according to embodiments of the invention. It is noted that to obtain this advertising quality look in a car photograph would normally take a professional photographer and two assistants the better part of a day to create these nine angles. The images as shown in FIG. 19 were captured and produced in 15 seconds with the horizon wall lighting technique that give the vehicle a sunset look that accents the body shape of the vehicle. It is also noted that although photographers may setup single angles in this style, embodiments of the structure booth is the first to create the horizon look over 360 degrees of vehicle reflection.

Figures 20A, 20B, 20C:
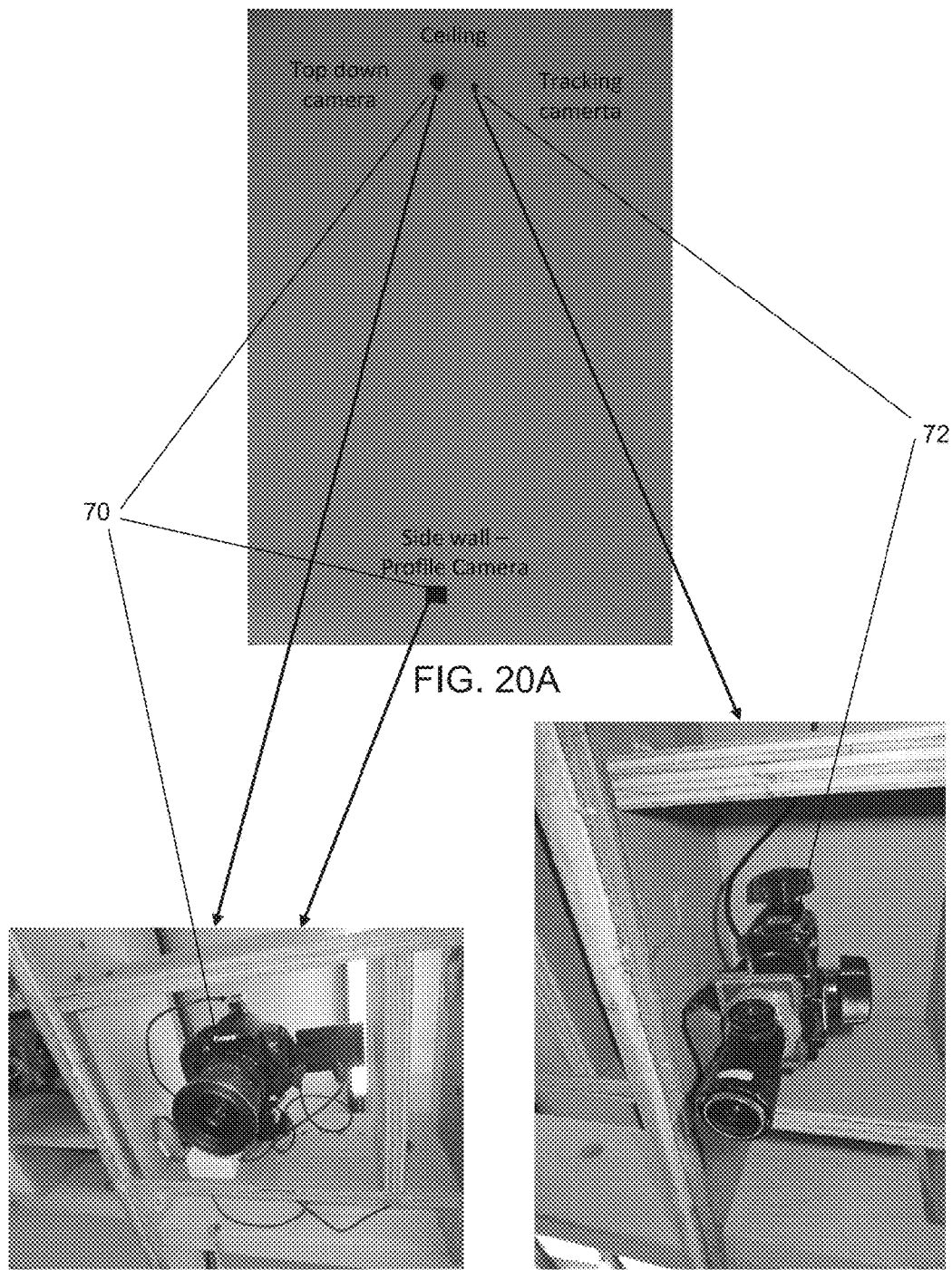
FIGS. 20A-20C are perspective views showing a portion of structure wall and ceiling showing the position of the image capture cameras and a tracking camera according to an embodiment of the invention.

FIGS. 20A-20C are perspective views showing a portion of structure wall and ceiling showing the position of the image capture cameras (top down, side wall) 70 and a tracking camera 72. In a specific embodiment, the tracking camera 72 is made from parts of two different web cameras and a fisheye lense for an IPhone. The tracking camera 72 runs at 10 to 60, and in some instances 30 frames per second (fps) and covers a view of 120-180 degrees. Super long camera trigger runs have been made by converting the trigger cables into Ethernet cables and back again into trigger cables at the cameras mounting location. In an embodiment camera flip boxes or shutters may obscure cameras when not in use, and flip open when the camera is in use. The shutter color will match the surface the camera is embedded in.

Figure 21A:
FIGS. 21A and 21B are perspective views showing a photo booth according to an embodiment of the invention.
Figure 21B:
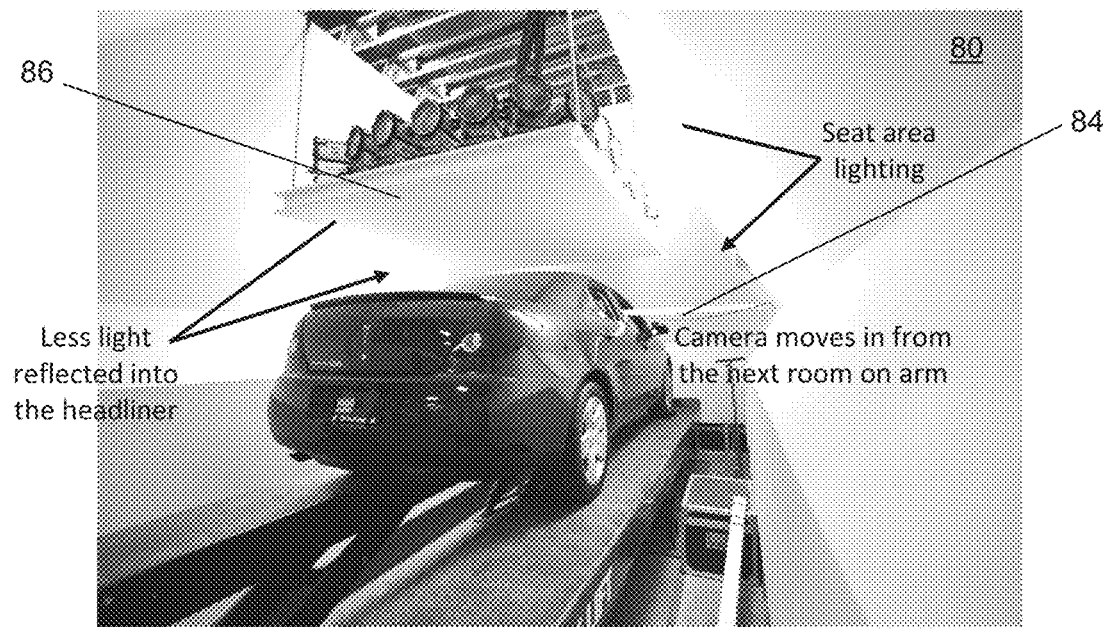
Figure 22A:
FIGS. 22A-22D are perspective views showing a circular photographic chamber according to an embodiment of the invention.
Figure 22B:
Figure 22C:
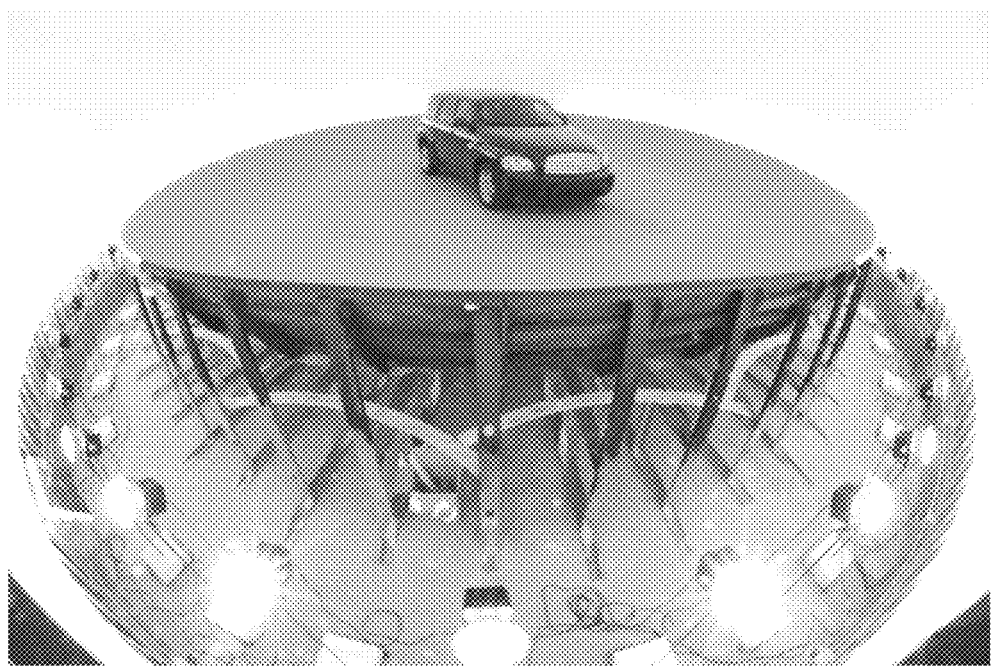
Figure 22D:

FIGS. 21A and 21B are perspective views showing a diamond shaped photo booth 80 according to an embodiment of the invention. The room shape is designed to throw light into a vehicle and up into the headliner for interior photographs. A vehicle lift 82 brings any size vehicle into the same lighting sweet spot. A camera alignment tool is used to align the camera with the vehicle dash. The camera comes in on a 10 to 18 foot arm 84 and can move completely out of the room while vehicles are in transition to be photographed. A lighting shell 86 keeps lights up where they can convex their generated heat right up the whole room vent. By not moving the lights around, the bulb life is increased by up to ten times. It is appreciated that a totally round exterior or diamond shaped interior rooms are also operative herein.

FIGS. 22A-22D are perspective views showing a circular photographic chamber according to an embodiment of the invention. A circular photographic chamber is well suited for generating three dimensional views.

Additional shaped photography stages include capsule and inverted funnel shaped stages. In specific embodiments, the photography stage may be shaped as two inverted funnels stacked on top of each other. A round truss above the funnel would shoot light down through the diffusion material and around the car. This fabric may be printed with a gradient or even a real sunset, and for exterior photos it may be in the 40 ft range. The photography stage could be backlit through the fabric or front lit from behind a horizon wall. If the photography stage is used for an automotive interior shooting booth, the size could be in the 20 ft range. For interiors in specific embodiments, a shoot-through diffusion material may be used as the lighting can be aimed into the vehicle, and be intense enough to penetrate deep but be diffused at the same time. Each of the two stacked, inverted funnels may have two opposing cutouts along the bottom edge (5 ft wide by 8 ft high), and when the two inverted funnels are counter rotated against each other a 10 ft×8 ft door way opens up on both sides. This opening allows a vehicle to pass straight though yet when closed gives a seamless white background out the windows of any photographs taken inside the vehicle or small details shots outside the vehicle.

By using a scissor mechanism connected to the two diffusion frames both entrance and exit may be opened or closed at the same time. This design allows for seamless white windows on interior shots, while also providing good interior lighting. In the studio the raw shots of the windows may be retouched so to show blank white, but in the raw photo files many lights outside the vehicle can be seen and/or often the interiors are shot in more than one piece allowing doors to be opened and light brought in closer. Typically, a photo shoot is conducted from a left and right half and alternate where the lighting is coming from to give a super clean look of a well lit interior with white windows that don't flare from the exterior lighting. For example, embodiments of the inventive photo booths allow for five standard interior shots on all vehicles, and this booth would allow them to be done as fast as the photographer could walk around the building. The RFID information may be shared with the exterior booth which will be located just outside the exit of the interior booth.

Figure 23:
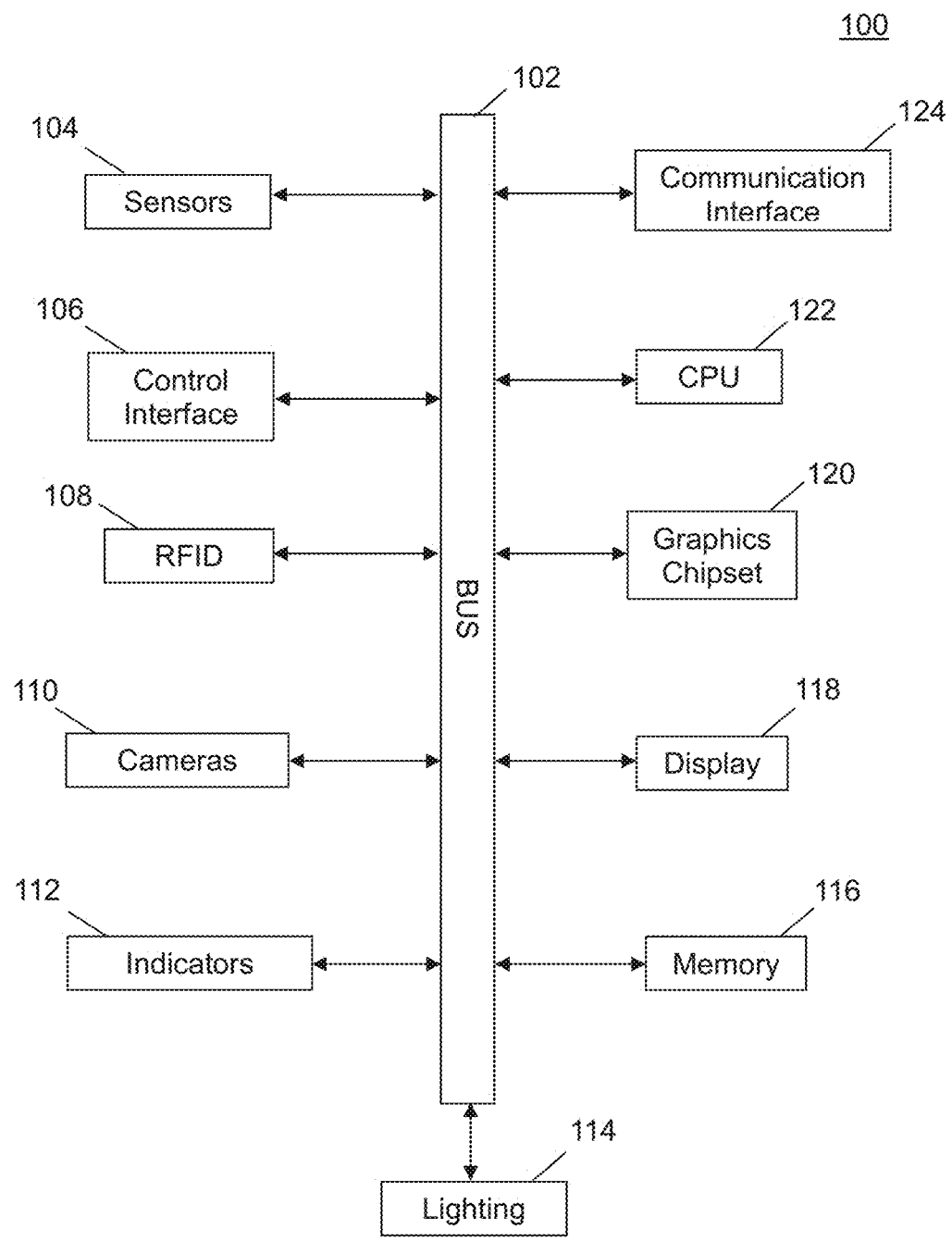
FIG. 23 is a system block diagram of the major components for photographing vehicles.

FIG. 23 is a system block diagram 100 of the major components for photographing vehicles. A central process unit (CPU) 122 coordinates and controls the overall operation of the photographing system 100 that may be operated in the drive-thru structure 30, and the other photographic chambers disclosed above. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID 108 is a reader that detects and interrogates tags mounted to vehicles or driver identification (ID) cards. Cameras 110 and lighting 114 are controlled and sequenced by the CPU 122. Indicators 112 provide visual feedback to system users.

As a person skilled in the art will recognize from the previous detailed description and from the figures and claims, modifications and changes can be made to the preferred embodiments of the invention without departing from the scope of this invention defined in the following claims.

The invention claimed is:

1. A system for photographing vehicles, the system comprising:
   a drive-thru structure formed of a light scattering wall with a plurality of cameras mounted within the light scattering wall for recording images of a vehicle;
   a horizon wall positioned within said drive-thru structure, said horizon wall configured to implement subtractive lighting on the surface of the vehicle;
   a lighting system positioned between the light scattering wall and the horizon wall, including a plurality of lights providing indirect light to the vehicle;
   a tracking system to actuate one or more of the plurality of cameras and lights in a predetermined sequence and combination based on the position of the vehicle within said drive-thru structure;
   and
   wherein the images of the vehicle are uploaded in a database.

2. The system of claim 1 wherein said drive-thru structure has a domed ceiling.

3. The system of claim 1 wherein said horizon wall extends for 270 degrees about the inner perimeter of said drive-thru structure.

4. The system of claim 1 wherein said horizon wall is a gray wall and has a curved surface.

5. The system of claim 1 further comprising a radio frequency identification (RFID) reader or alphanumeric reader for identifying vehicle and client parameters upon entry into said drive-thru structure.

6. The system of claim 5 wherein said RFID reader or said alphanumeric reader obtains the vehicle identification number (VIN) of the vehicle to be processed;
   wherein a set of information related to the vehicle is encoded in said VIN, said set of information comprising one or more of vehicle make, model, body style, and vehicle color.

7. The system of claim 6 wherein said set of information encoded in said VIN is used to automatically adjust lighting, the height and/or angle of a gray wall of said wall to adjust photographic conditions, as well as the height, zoom, and camera placement/position of said plurality of cameras for the subject vehicle to be processed.

8. The system of claim 1 further comprising a threshold bump to establish an idle speed for the vehicle within said drive-thru structure.

9. The system of claim 1 further comprising a central process unit (CPU), said CPU coordinates and controls said plurality of cameras in the drive-thru structure; and
   wherein a communication interface connects said plurality of cameras via one or more of wired and wireless links, optical drives, universal serial bus (USB), flash memory slot, and combinations thereof for receiving and sending data.

10. The system of claim 1 further comprising a database with vehicle and client information.

11. The system of claim 1 wherein said light scattering wall and said horizon wall are configured to bounce light from the lighting system onto the surface of the vehicle.

12. The system of claim 1 wherein said plurality of cameras and said lighting system are static.

13. The system of claim 1 wherein the horizon wall is spaced 12 to 24 inches from the light scattering wall.

14. The system of claim 1 wherein the light a scattering wall surrounds a photography stage.

15. The system of claim 14 wherein said horizon wall is positioned between the light scattering wall and the photography stage.

16. A system for photographing vehicles, the system comprising:
   a drive-thru structure with a plurality of cameras mounted within the walls for recording images of a vehicle;
   at least one camera, video system, or computing system to generate 3D data from the vehicle passed through the structure;
   a lighting system;
   a tracking system to actuate one or more of the plurality of cameras and lights in a predetermined sequence and combination based on the position of the vehicle within said drive-thru structure;
   a wall for implementing subtractive lighting on the surface of the vehicle;
   wherein the images of the vehicle are uploaded in a database;
   a radio frequency identification (RFID) reader or alphanumeric reader for identifying vehicle and client parameters upon entry into said drive-thru structure, wherein said RFID reader or said alphanumeric reader obtains a vehicle identification number (VIN) of the vehicle to be processed, and wherein a set of information related to the vehicle is encoded in said VIN, said set of information comprising one or more of vehicle make, model, body style, and vehicle color; and
   wherein said set of information encoded in said VIN is used to automatically adjust lighting, the height and/or angle of a gray wall of said wall to adjust photographic conditions, as well as the height, zoom, and camera placement/position of said plurality of cameras for the subject vehicle to be processed.

* * * * *